(12) United States Patent
Mori et al.

(10) Patent No.: US 6,930,053 B2
(45) Date of Patent: Aug. 16, 2005

(54) METHOD OF FORMING GRATING MICROSTRUCTURES BY ANODIC OXIDATION

(75) Inventors: Kazushi Mori, Hirakata (JP); Mitsuaki Matsumoto, Osaka (JP); Koji Tominaga, Hirakata (JP); Atsushi Tajiri, Osaka (JP); Koutarou Furusawa, Higashiosaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/394,033

(22) Filed: Mar. 24, 2003

(65) Prior Publication Data

US 2003/0179453 A1 Sep. 25, 2003

(30) Foreign Application Priority Data

Mar. 25, 2002 (JP) ........................................ 2002-082249

(51) Int. Cl.⁷ ...................... H01L 21/302; H01L 21/461
(52) U.S. Cl. ...................... 438/745; 359/566; 359/569; 438/738; 438/770
(58) Field of Search ................................ 359/566, 569; 438/608, 609, 641, 689, 717, 738, 740, 745, 770

(56) References Cited

FOREIGN PATENT DOCUMENTS

| JP | 63015203 | * | 1/1988 |
| JP | 01282503 | * | 11/1989 |

OTHER PUBLICATIONS

"Highly ordered nanochannel–array architecture in anodic alumina", "Hideki Masuda et al", Appl. Phys. Lett. 71 (19), Nov. 10, 1997, pp. 2770–2772, Department of Industrial chemistry, Faculty of Engineering, Tokyo Metropolitan University, 1–1 Minamiosawa, Hachioji, Tokyo 192–03, Japan.

"Self–Ordering of Cell Configuration of Anodic Porous Alumina with Large–Size Pores in Phosphoric Acid Solution", "Hideki Masuda et al." Jpn. J. Appl. Phys., vol. 37 (1998) pp. L1340–L1343, Part 2, No. 11A, Nov. 1, 1998, Hochioji, Tokyo, Japan.

"Self–organized formation of hexagonal pore arrays in anodic alumina", "O. Jessensky, et al.", Applied Physics Letters, vol. 72, No. 10, Mar. 9, 1998, pp. 1173–1175, Halle, Germany.

"Conditions for Fabrication of Ideally Ordered Anodic Porous Alumina Using Pretextured AL", "Hidetaka Asoh, et al.", Journal of the Electrochemical Society, 148 (4) pp. B152–B146, (2001), Tokyo, Japan.

"Micropolarizer made of the anodized alumina film", "M. Saito, et al", Appl. Phys. Lett 55 (7), Aug. 14, 1989, Sendai, Japan.

"Subwavelength surface–relief gratings fabricated by micro-contact printing of self–assembled monolayers", "Ali G. Lopez and Harold G. Craighead", Applied Optics/vol. 40, No. 13/May 1, 2001, pp. 2068–2075, Ithaca, New York.

* cited by examiner

*Primary Examiner*—Asok Kumar Sarkar
(74) *Attorney, Agent, or Firm*—McDermott Will & Emery LLP

(57) ABSTRACT

A method of manufacturing an element having a microstructure of an excellent grating groove pattern or the like is obtained. This method of manufacturing an element having a microstructure comprises steps of forming a metal layer on a substrate, forming a dot column of concave portions on the surface of the metal layer and anodically oxidizing the surface of the metal layer formed with the dot column of concave portions while opposing this surface to a cathode surface thereby forming a metal oxide film having a grating groove pattern. When the interval between the concave portions of the dot column is reduced, therefore, a linear grating groove pattern having a large depth with a uniform groove width along the depth direction is easily formed in a self–organized manner.

8 Claims, 27 Drawing Sheets

10a  10b 99a  99a  99a 99b  99b  99b

METHOD OF FORMING GRATING MICROSTRUCTURES BY ANODIC OXIDATION

BACKGROUND OF THE INVENTION

1. Field of the Invention

The present invention relates to an element having a microstructure and a method of manufacturing the same, and more particularly, it relates to an element having a microstructure formed by anodic oxidation and a method of manufacturing the same.

2. Description of the Background Art

In general, a method employing photolithography and etching or a method employing anodic oxidation is known as a method of manufacturing a microstructure of a micro lattice pattern or the like. In recent years, an element having a micro grating groove pattern such as an optical element has been implemented through photolithography and etching.

FIG. 45 is a perspective view showing the concept of a conventional wave plate (polarization element) 100 serving as an element having a microstructure. In the conventional wave plate 100, groove patterns constituting a grating are formed on a glass substrate 101, as shown in FIG. 45. The grating groove patterns are formed by air layers 102 and substrate material layers 103, having a width a, consisting of the same material as the glass substrate 101. The grating groove patterns have a period P not more than the wavelength of light. It is assumed that the refractive indices of the air layers 102 and the substrate material layers 103 (the glass substrate 101) are 1 and n respectively. When light is incident upon the grating groove patterns of the wave plate 100, the wave plate 100 exhibits an effective refractive index corresponding to the mixture of the refractive indices 1 and n of the air layers 102 and the substrate material layers 103.

FIG. 46 is a correlation diagram showing the relation between the effective refractive index and the duty ratio of the conventional wave plate (polarization element) 100 shown in FIG. 45. Referring to FIG. 46, the vertical axis shows the effective refractive index, and the horizontal axis shows the duty ratio (a/P), i.e., the ratio of the width a of the substrate material layers 103 to the period P of the grating. Further, symbol TE denotes light having a direction of polarization parallel to the extensional direction of the grating groove patterns, as shown in FIG. 45. Symbol TM denotes light having a direction of polarization perpendicular to the extensional direction of the grating groove patterns, as shown in FIG. 45.

Referring to FIG. 46, the effective refractive index varies with the duty ratio of the grating groove patterns. In this case, the effective refractive index of the light TE having the direction of polarization parallel to the grating groove patterns differs from that of the light TM having the direction of polarization perpendicular to the grating groove patterns. The characteristic of the effective refractive index varying with the direction of polarization of light is referred to as a birefringence property. Generally known is a polarization-dependent diffraction grating (polarization-dependent diffraction element) capable of presenting no refractive index modulation with respect to light having a prescribed direction of polarization while presenting refractive index modulation only with respect to light having a direction of polarization perpendicular to the prescribed direction of polarization of the said light. The conventional polarization-dependent diffraction grating is now described.

FIG. 47 is a plan view showing grating groove patterns of a conventional polarization-dependent diffraction grating (polarization-dependent diffraction element) having a microstructure. Referring to FIGS. 46 and 47, rectilinear grating groove patterns 100a and rectilinear grating groove patterns 100b extending substantially perpendicularly to the grating groove patterns 100a are alternately formed on a glass substrate 101 in the conventional polarization-dependent diffraction grating. The grating groove patterns 100a and 100b have different duty ratios D1 (=(P−W1)/P) and D2 (=(P−W2)/P) respectively. The grating groove patterns 100a and 100b have the same period P. In other words, the duty ratios D1 and D2 of the grating groove patterns 100a and 100b are adjusted by adjusting the widths W1 and W2 of grooves of the grating groove patterns 100a and 100b respectively.

When light having a direction TE of polarization parallel to the grating groove patterns 100a having the duty ratio D1 is incident, the direction of this light is a direction TM of polarization perpendicular to the grating groove patterns 100b in the grating groove patterns 100b having the duty ratio D2. Therefore, both the effective refractive indices of the grating groove patterns 100a and 100b having the duty ratios D1 and D2 correspond to N5, as shown in FIG. 46. When light having the direction TM of polarization perpendicular to the grating groove patterns 100a having the duty ratio D1 is incident, on the other hand, the direction of this light is the direction TE of polarization parallel to the grating groove patterns 100b in the grating groove patterns 100b having the duty ratio D2. Therefore, the effective refractive indices of the grating groove patterns 100a and 100b having the duty ratios D1 and D2 correspond to N4 and N6 respectively, as shown in FIG. 46. Thus, the effective refractive indices of the grating groove patterns 100a and 100b having the duty ratios D1 and D2 can be equally set to the level N5 with respect to the light having the direction TE of polarization parallel to the grating groove patterns 100a, whereby the grating groove patterns 100a and 100b can be brought into a state (transparent) exhibiting no refractive index modulation only with respect to the light having the direction TE of polarization parallel to the grating groove patterns 100a.

As a manufacturing process for the rectilinear grating groove patterns of the conventional wave plate 100 shown in FIG. 45 or the rectilinear grating groove patterns 100a and 100b of the conventional polarization-dependent diffraction grating shown in FIG. 47, a method of forming rectilinear grating groove patterns by etching the surface of a glass substrate by photolithography and etching is conceivable, for example.

In the case of forming the rectilinear grating groove patterns of the conventional wave plate 100 shown in FIG. 45 or the rectilinear grating groove patterns 100a and 100b of the conventional polarization-dependent diffraction grating shown in FIG. 47 by photolithography and etching, however, it is difficult to form grating groove patterns having a large depth with a uniform groove width along the depth direction. More specifically, rectilinear grating groove patterns deeply formed by photolithography and etching have trapezoidal sections non-uniform in the depth direction as shown in FIG. 48, and hence duty ratios in upper and lower portions of the grating groove patterns disadvantageously differ from each other. Consequently, it is difficult to form an element having a microstructure of excellent grating groove patterns or the like, and hence it is disadvantageously difficult to obtain an optical element having an excellent birefringence property.

H. Masuda et al., "Appl. Phys. Lett.", Vol. 71 (19), 10 Nov. 1997, pp. 2770–2772 discloses a process of manufacturing a triangular lattice pattern employing anodic oxidation. The process of manufacturing a triangular lattice pattern disclosed in this literature, capable of forming a triangular lattice pattern having deep and uniform micropores, is proposed as a process of preparing a two-dimensional photonic crystal. More specifically, a valve metal such as aluminum, titanium or tantalum or a semiconductor such as Si or GaAs has such a characteristic that an oxide film having micropores arranged perpendicular to the film surface is formed when an anode is electrified in an acidic electrolyte. In particular, an oxide film of aluminum has such a material characteristic that micropores are easily arranged in the form of a triangular lattice. A triangular lattice pattern having deep and uniform micropores can be formed through this characteristic.

FIGS. 49 to 52 are sectional views for illustrating a conventional process of manufacturing a triangular lattice pattern by anodic oxidation. FIG. 53 is a plan view showing a two-dimensional photonic crystal. The conventional process of manufacturing a triangular lattice pattern by anodic oxidation is now described with reference to FIGS. 49 to 53.

In the conventional process of manufacturing a triangular lattice pattern by anodic oxidation, projecting portions 116a arranged in the form of a triangular lattice are formed on the surface of a press member 116 consisting of a hard material such as SiC, as shown in FIG. 49. Texturing is performed by pressing the press member 116 against the surface of an aluminum material 115. Thus, concave portions 115a arranged in the form of a triangular lattice are formed on the surface of the aluminum material 115, as shown in FIG. 50. Then, the aluminum material 115 formed with the concave portions 115a is oxidized in an electrolyte 119, as shown in FIG. 51. In this case, a cathode 118 is prepared from platinum or the like, and the electrolyte 119 is prepared from an aqueous solution of sulfuric acid, oxalic acid or phosphoric acid. Thus, an aluminum oxide (alumina) film 113 having deep and uniform micropores 113, starting from the concave portions 115a, arranged in the form of a triangular lattice is formed in a self-organized manner, as shown in FIGS. 52 and 53. The micropores 113a can be formed to have a depth of at least 10 μm with respect to submicron diameters.

However, the aforementioned conventional method of manufacturing a triangular lattice pattern by anodic oxidation has been known as a method of forming two-dimensional photonic crystal micropores. In general, therefore, there has been no attempt of forming linear grating groove patterns shown in FIG. 45 or 47 by anodic oxidation.

As hereinabove described, it has been difficult to form a linear grating groove pattern having a large depth with a uniform groove width along the depth direction in general, and hence it has been difficult to form an element having a microstructure of an excellent grating groove pattern or the like.

SUMMARY OF THE INVENTION

An object of the present invention is to provide a method of manufacturing an element having a microstructure of an excellent grating groove pattern or the like.

Another object of the present invention is to provide an element having a microstructure of an excellent grating groove pattern or the like.

In order to attain the aforementioned objects, the inventors have made deep study to find out that a linear grating groove pattern having a uniform groove width along the depth direction can be formed by conventional anodic oxidation. The specific contents of the present invention are now described.

A method of manufacturing an element having a microstructure according to a first aspect of the present invention comprises steps of forming a metal layer on a substrate, forming a dot column of concave portions on the surface of the metal layer and anodically oxidizing the surface of the metal layer formed with the dot column of concave portions while opposing this surface to a cathode surface thereby forming a metal oxide film having a linear grating groove pattern.

In the method of manufacturing an element having a microstructure according to the first aspect, the surface of the metal layer formed with the dot column of concave portions is anodically oxidized in the state opposed to the cathode surface as hereinabove described, whereby the linear grating groove pattern having a large depth with a uniform groove width along the depth direction can be easily formed in a self-organized manner when the interval between the concave portions of the dot column is reduced. Consequently, an element having a microstructure of an excellent grating groove pattern or the like can be easily formed. When the method of manufacturing an element according to the first aspect is applied to formation of an optical element serving as an exemplary element having a microstructure in this case, an optical element having an excellent birefringence property can be easily formed.

In the aforementioned method of manufacturing an element having a microstructure according to the first aspect, the step of forming the dot column of concave portions preferably includes a step of forming the dot column of concave portions with deviation from a position for forming a triangular lattice. According to this structure, the position for forming the triangular lattice can be prevented from formation of pores, whereby the pores can be prevented from formation in portions other than grating grooves. Thus, a more excellent element having a microstructure of a grating groove pattern or the like can be formed. When this structure is applied to an optical element serving as an exemplary element having a microstructure, the refractive index thereof is not disadvantageously changed due to light incident upon pores formed on portions other than the grating grooves.

In the aforementioned method of manufacturing an element having a microstructure according to the first aspect, the step of forming the metal oxide film having the grating groove pattern preferably includes a step of anodically oxidizing the surface of the metal layer formed with the dot column while opposing this surface to the cathode surface thereby forming pores corresponding to the dot column and thereafter enlarging the pores corresponding to the dot column by etching thereby forming the metal oxide film having the grating groove pattern. According to this structure, adjacent ones of the pores are connected with each other due to enlargement of the pores corresponding to the dot column, whereby a microstructure of an excellent grating groove pattern or the like having adjacent pores connected with each other can be further easily formed.

The aforementioned method of manufacturing an element having a microstructure according to the first aspect preferably further comprises a step of forming a transparent conductor film on the substrate in advance of the step of forming the metal layer on the substrate. According to this structure, the transparent conductor film serves as an electrode when the metal layer is anodically oxidized for forming the metal oxide film, whereby the metal layer can be completely oxidized also when the substrate has an irregular surface. Thus, the metal layer can be prevented from forming unoxidized portions.

In the aforementioned method of manufacturing an element having a microstructure according to the first aspect, the step of forming the metal oxide film having the linear grating groove pattern preferably includes a step of forming the metal oxide film having a rectilinear grating groove pattern. According to this structure, an element having an excellent rectilinear grating groove pattern can be easily formed.

In the aforementioned method of manufacturing an element having a microstructure according to the first aspect, the step of forming the metal oxide film having the linear grating groove pattern preferably includes a step of forming the metal oxide film having a curvilinear grating groove pattern. According to this structure, an element having an excellent curvilinear grating groove pattern can be easily formed.

A method of manufacturing an element having a microstructure according to a second aspect of the present invention comprises steps of forming a metal layer on a substrate, periodically forming mask layers on the surface of the metal layer and anodically oxidizing the surface of the metal layer formed with the mask layers while opposing this surface to a cathode surface thereby forming a metal oxide film having a linear grating groove pattern.

In the method of manufacturing an element having a microstructure according to the second aspect, the mask layers are periodically formed on the surface of the metal layer and the surface of the metal layer is thereafter anodically oxidized in the state opposed to the cathode surface thereby forming the metal oxide film having the linear grating groove pattern as hereinabove described, whereby the linear grating groove pattern having a large depth with a uniform groove width along the depth direction can be easily formed only on a region formed with no mask layer in a self-organized manner. Consequently, an element having a microstructure of an excellent grating groove pattern or the like can be easily formed. When the method of manufacturing an element according to the second aspect is applied to formation of an optical element serving as an exemplary element having a microstructure in this case, an optical element having an excellent birefringence property can be easily formed. Further, the mask layers are so formed as to prevent portions (regions formed with the mask layer) other than grating grooves from forming pores, whereby the refractive index is not disadvantageously changed due to light incident upon pores formed in portions other than the grating grooves.

In the aforementioned method of manufacturing an element having a microstructure according to the second aspect, the step of forming the metal oxide film having the grating groove pattern preferably includes a step of anodically oxidizing the surface of the metal layer formed with the mask layers while opposing this surface to the cathode surface thereby forming micropores on the surface of the metal oxide film formed with no mask layers and thereafter enlarging the micropores by etching thereby forming the metal oxide film having the grating groove pattern. According to this structure, adjacent ones of the pores are connected with each other due to enlargement of the micropores formed through the metal oxide film, whereby a microstructure of an excellent grating groove pattern or the like having adjacent pores connected with each other can be further easily formed.

The aforementioned method of manufacturing an element having a microstructure according to the second aspect preferably further comprises a step of etching the metal layer through mask of the mask layers thereby forming etching grooves in advance of the step of forming the metal oxide film having the grating groove pattern. According to this structure, an electric field is easily distorted in step portions formed by the etching grooves, whereby micropores are easily formed on the step portions of the etching grooves located on the boundaries between the regions formed with the mask layers and the etching grooves. Thus, accuracy for positions for forming the micropores can be improved.

In this case, the width of the etching grooves and the width of the mask layers are set to satisfy a relational expression $L \neq 2S$ assuming that S represents the width of the etching grooves and L represents the width of the mask layers respectively. According to this structure, virtual positions of pores forming a triangular lattice can be prevented from coinciding, whereby the regions formed with the mask layers can be inhibited from forming of micropores.

The aforementioned method of manufacturing an element having a microstructure according to the second aspect preferably further comprising a step of forming a transparent conductor film on the substrate in advance of the step of forming the metal layer on the substrate. According to this structure, the transparent conductor film serves as an electrode when the metal layer is anodically oxidized for forming the metal oxide film, whereby the metal layer can be completely oxidized also when the substrate has an irregular surface. Thus, the metal layer can be prevented from forming unoxidized portions.

In the aforementioned method of manufacturing an element having a microstructure according to the second aspect, the step of forming the metal oxide film having the linear grating groove pattern preferably includes a step of forming the metal oxide film having a rectilinear grating groove pattern. According to this structure, an element having an excellent rectilinear grating groove pattern can be easily formed.

In the aforementioned method of manufacturing an element having a microstructure according to the second aspect, the step of forming the metal oxide film having the linear grating groove pattern preferably includes a step of forming the metal oxide film having a curvilinear grating groove pattern. According to this structure, an element having an excellent curvilinear grating groove pattern can be easily formed.

A method of manufacturing an element having a microstructure according to a third aspect of the present invention comprises steps of forming a metal layer on a substrate, anodically oxidizing the surface of the metal layer while opposing this surface to a cathode surface thereby forming a metal oxide film having micropores, periodically forming mask layers on the surface of the metal oxide film and enlarging the micropores in a region formed with no mask layer through masks of the mask layers by etching thereby forming a metal oxide film having a linear grating groove pattern.

In the method of manufacturing an element having a microstructure according to the third aspect, the surface of the metal layer is anodically oxidized in the state opposed to the cathode surface thereby forming the metal oxide film having micropores and the mask layers are periodically formed on the surface of the metal oxide film so that the mask layers are employed as masks for enlarging micropores by etching in the region formed with no mask layer as hereinabove described, whereby adjacent ones of the pores are connected with each other due to enlargement of the micropores in the region formed with no mask layer and hence the linear grating groove pattern having a large depth with a uniform groove width along the depth direction can be formed only on the region formed with no mask layer. Consequently, an element having a microstructure of an excellent grating groove pattern or the like can be easily formed. When the method of manufacturing an element according to the third aspect is applied to formation of an optical element serving as an exemplary element having a microstructure in this case, an optical element having an excellent birefringence property can be easily formed.

In the aforementioned method of manufacturing an element having a microstructure according to the third aspect, the step of forming the metal oxide film having micropores preferably includes a step of forming the metal oxide film having micropores arranged in the form of a triangular lattice. According to this structure, dimensional accuracy of the grating groove pattern formed by coupling the micropores with each other can be improved as compared with a case of forming micropores at random.

The aforementioned method of manufacturing an element having a microstructure according to the third aspect preferably further comprises a step of forming a transparent conductor film on the substrate in advance of the step of forming the metal layer on the substrate. According to this structure, the transparent conductor film serves as an electrode when the metal layer is anodically oxidized for forming the metal oxide film, whereby the metal layer can be completely oxidized also when the substrate has an irregular surface. Thus, the metal layer can be prevented from forming of unoxidized portions.

In the aforementioned method of manufacturing an element having a microstructure according to the third aspect, the step of forming the metal oxide film having the linear grating groove pattern preferably includes a step of forming the metal oxide film having a rectilinear grating groove pattern. According to this structure, an element having an excellent rectilinear grating groove pattern can be easily formed.

In the aforementioned method of manufacturing an element having a microstructure according to the third aspect, the step of forming the metal oxide film having the linear grating groove pattern preferably includes a step of forming the metal oxide film having a curvilinear grating groove pattern. According to this structure, an element having an excellent curvilinear grating groove pattern can be easily formed.

A method of manufacturing an element having a microstructure according to a fourth aspect of the present invention comprises steps of forming a metal layer on a substrate, forming a dot column of concave portions on the surface of the metal layer and anodically oxidizing the surface of the metal layer formed with the dot column of concave portions while opposing this surface to a cathode surface thereby forming a metal oxide film having a rectilinear grating groove pattern.

In the method of manufacturing an element having a microstructure according to the fourth aspect, the surface of the metal layer formed with the dot column of concave portions is anodically oxidized in the state opposed to the cathode surface for forming the metal oxide film having the rectilinear grating groove pattern as hereinabove described, whereby the rectilinear grating groove pattern having a large depth with a uniform groove width along the depth direction can be easily formed in a self-organized manner when the interval between the concave portions of the dot column is reduced. Consequently, an element having a microstructure of an excellent rectilinear grating groove pattern or the like can be easily formed. When the method of manufacturing an element according to the fourth aspect is applied to formation of an optical element serving as an exemplary element having a microstructure in this case, an optical element having an excellent birefringence property can be easily formed.

A method of manufacturing an element having a microstructure according to a fifth aspect of the present invention comprises steps of forming a metal layer on a substrate, forming a dot column of concave portions on a side surface of the metal layer and anodically oxidizing the side surface of the metal layer formed with the dot column of concave portions while opposing this side surface to a cathode end thereby forming a metal oxide film having a lattice pore pattern extending substantially in parallel with the surface of the substrate.

In the method of manufacturing an element having a microstructure according to the fifth aspect, the side surface of the metal layer formed with the dot column of concave portions is anodically oxidized in the state opposed to the cathode end for forming the metal oxide film having a lattice pore pattern extending substantially in parallel with the surface of the substrate as hereinabove described, whereby a micropore pattern extending substantially in parallel with the substrate and having a uniform pore size along the depth direction can be easily formed in a self-organized manner. Consequently, an element having a microstructure of an excellent micropore pattern or the like can be easily formed. When the method of manufacturing an element according to the fifth aspect is applied to formation of an optical element serving as an exemplary element having a microstructure and introducing light perpendicularly to the surface of the metal oxide film, the effective refractive index can be varied with light having a direction of polarization parallel to the extensional direction of the micropore pattern and with light having a direction of polarization perpendicular to the extensional direction of the micropore pattern.

An element having a microstructure according to a sixth aspect of the present invention comprises a substrate and a metal oxide film, formed on the substrate, having a linear grating groove pattern.

In the element having a microstructure according to the sixth aspect, the metal oxide film having a linear grating groove pattern is formed on the substrate as hereinabove described, whereby the linear grating groove pattern having a large depth with a uniform groove width along the depth direction can be easily formed in a self-organized manner when the metal oxide film is formed by anodic oxidation, so that the element can be easily formed with a microstructure of an excellent grating groove pattern or the like. When the structure according to the sixth aspect is applied to an optical element serving as an exemplary element having a microstructure, an optical element having an excellent birefringence property can be easily obtained.

In the aforementioned element having a microstructure according to the sixth aspect, the linear grating groove pattern preferably includes a pore column pattern formed by linearly coupling micropores with each other. According to this structure, the microstructure of a grating groove pattern or the like of linearly can be easily formed by linearly coupling micropores with each other by conventional anodic oxidation for forming a micropore pattern.

The aforementioned element having a microstructure according to the sixth aspect preferably further comprises a transparent conductor film formed between the substrate and the metal oxide film. According to this structure, the transparent conductor film serves as an electrode when the metal layer is anodically oxidized for forming the metal oxide film, whereby the metal layer can be completely oxidized also when the substrate has an irregular surface. Thus, the metal layer can be prevented from forming of unoxidized portions.

In the aforementioned element having a microstructure according to the sixth aspect, the linear grating groove pattern preferably includes a rectilinear grating groove pattern. According to this structure, an element having an excellent rectilinear grating groove pattern can be easily obtained.

In the aforementioned element having a microstructure according to the sixth aspect, the linear grating groove pattern preferably includes a curvilinear grating groove pattern. According to this structure, an element having an excellent curvilinear grating groove pattern can be easily obtained.

In the aforementioned element having a microstructure according to the sixth aspect, the linear grating groove pattern preferably includes a linear first groove pattern extending in a first direction and a linear second groove pattern extending in a direction substantially perpendicular to the first groove pattern, and the first groove pattern and the second groove pattern may be alternately formed. According to this structure, diffraction gratings having different polarization dependencies can be prepared when the element according to the sixth aspect is applied to an optical element serving as an exemplary element having a microstructure. When adjusting the duty ratios of the first and second groove patterns, therefore, the refractive indices of the first and second groove patterns can be equalized with each other only with respect to light having a direction of polarization perpendicular to the first groove pattern, for example, whereby the first and second groove patterns can be brought into a state (transparent) exhibiting no refractive index modulation. Thus, an excellent extinction ratio can be obtained. Further, the first and second groove patterns can be formed to have uniform groove widths by anodic oxidation, so that duty ratios of upper and lower portions are uniform. Consequently, a further excellent extinction ratio can be obtained.

In the aforementioned element having a microstructure according to the sixth aspect, the metal oxide film having the linear grating groove pattern is preferably used for any of a polarization element, a polarization-dependent diffraction element and a multilayer film element. According to this structure, a polarization element, a polarization-dependent diffraction element or a multilayer film element having a grating groove pattern can be easily obtained.

An element having a microstructure according to a seventh aspect of the present invention comprises a substrate and a metal oxide film, formed on the substrate, having a rectilinear grating groove pattern.

In the element having a microstructure according to the seventh aspect, the metal oxide film having a rectilinear grating groove pattern is formed on the substrate as hereinabove described, whereby the rectilinear grating groove pattern having a large depth with a uniform groove width along the depth direction can be easily formed in a self-organized manner when the metal oxide film is formed by anodic oxidation, so that an element having a microstructure of an excellent rectilinear grating groove pattern or the like can be easily obtained. When the structure according to the seventh aspect is applied to an optical element serving as an exemplary element having a microstructure, an optical element having an excellent birefringence property can be easily obtained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to the drawings.

(First Embodiment)

A process of manufacturing a wave plate according to a first embodiment of the present invention is described with reference to FIGS. 1 to 7.

Figure 1:
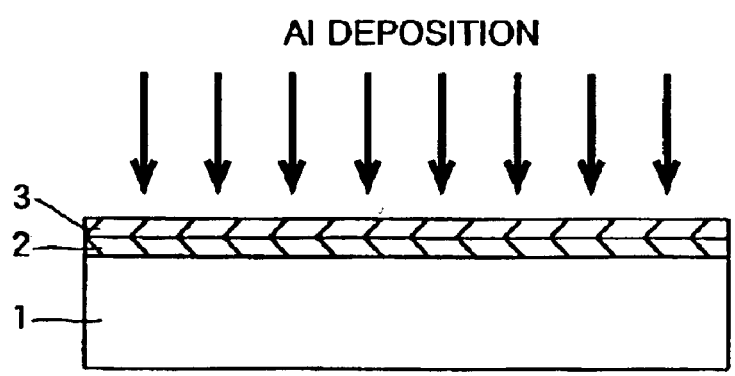
FIGS. 1 and 2 are sectional views for illustrating a process of manufacturing a wave plate (polarization element) as an element having a microstructure according to a first embodiment of the present invention.

First, a transparent electrode film 2 consisting of ITO or ZnO and an aluminum film 3 having a thickness of about 3 $\mu$m are successively formed on a glass substrate 1 by vapor deposition, as shown in FIG. 1. The glass substrate 1 is an example of the "substrate" in the present invention, and the transparent electrode film 2 is an example of the "transparent conductor film" in the present invention. The aluminum film 3 is an example of the "metal layer" in the present invention.

Figure 2:
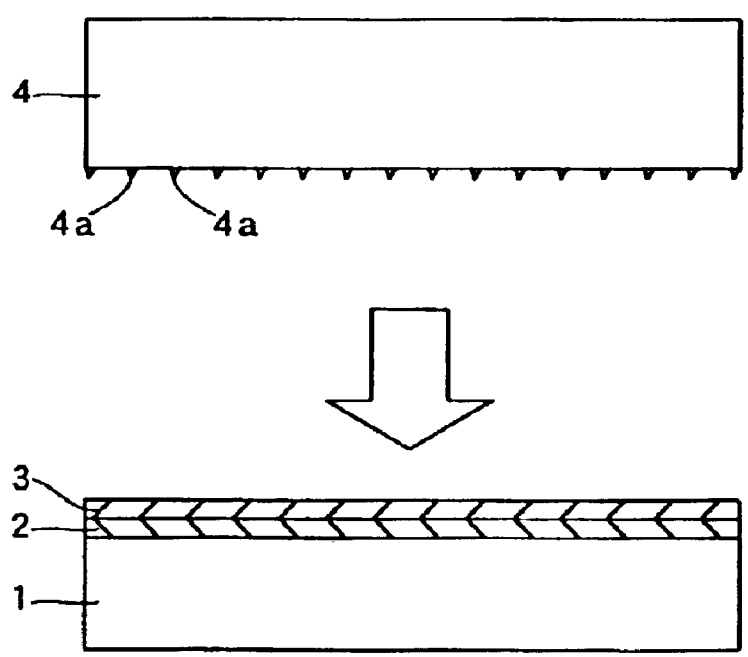

As shown in FIG. 2, regularly arranged projecting portions 4a are formed on the surface of a press member 4 consisting of a hard material such as SiC, in order to perform texturing. According to the first embodiment, the projecting portions 4a (see FIG. 2) of the press member 4 are so formed as to define dot columns of concave portions 3a on the surface of the textured aluminum film 3 every other column of a plurality of triangular lattice patterns 5 shown by broken lines. The press member 4 is pressed against the surface of the aluminum film 3 by texturing as shown in FIG. 2, thereby forming the dot columns of the concave portions 3a on the surface of the aluminum film 3 in the arrangement shown in FIG. 3.

Figure 3:
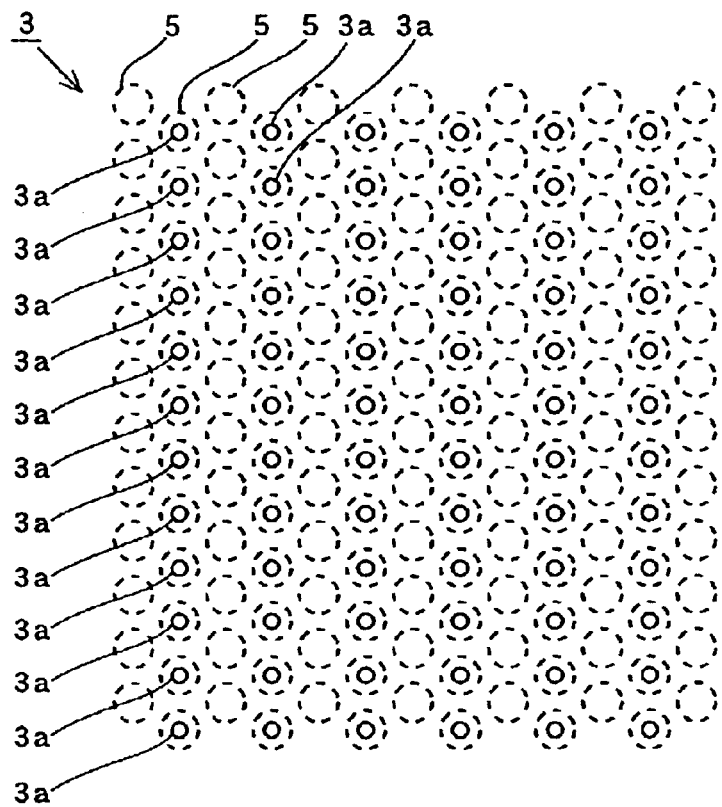
FIG. 3 is a plan view for illustrating the process of manufacturing the wave plate (polarization element) as the element having a microstructure according to the first embodiment of the present invention.
Figure 4:
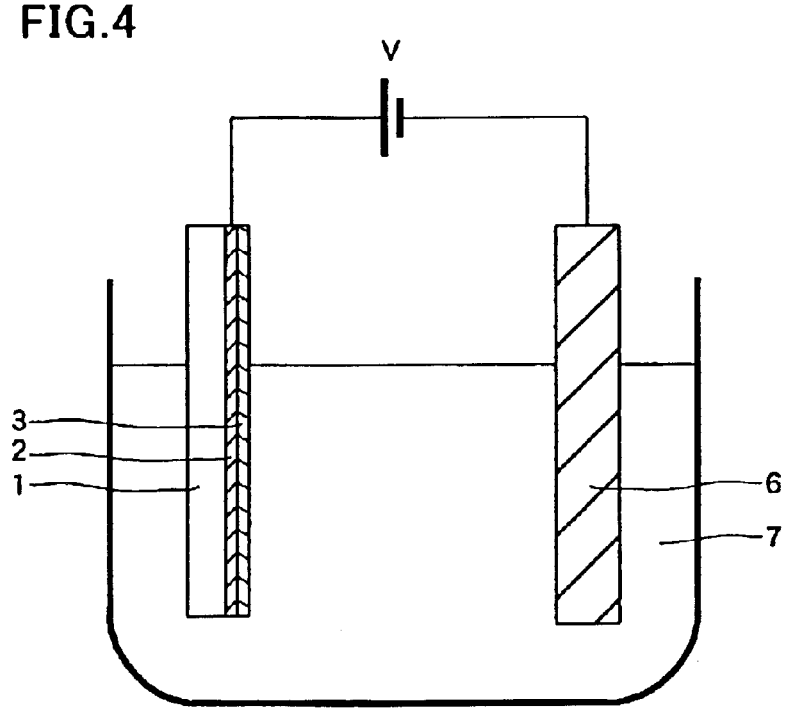
FIGS. 4 and 5 are sectional views for illustrating the process of manufacturing the wave plate (polarization element) as the element having a microstructure according to the first embodiment of the present invention.

As shown in FIG. 4, the aluminum film 3 formed with the dot columns of the concave portions 3a (see FIG. 3) is anodically oxidized thereby forming pores (not shown) corresponding to the dot columns. More specifically, the surface of the aluminum film 3 serving as an anode is opposed to the surface of a cathode 6 consisting of platinum. A voltage of about 30 V is applied in aqueous sulfuric acid 7 of about 5% in concentration thereby performing oxidation for about 20 minutes. According to the first embodiment, the voltage is applied to the aluminum film 3 through the transparent electrode film 2 formed between the glass substrate 1 and the aluminum film 3. Thus, the voltage can be regularly applied to the aluminum film 3 during the oxidation, thereby preventing the aluminum film 3 from disadvantageously leaving unoxidized portions also when the glass substrate 1 has an irregular surface. Thus, an aluminum oxide film 8 having micropores is formed in a self-organized manner. In relation to such micropores formed by anodic oxidation, it is known that a relational expression U=0.0025Va ($\mu$m) holds assuming that U represents the maximum distance between adjacent pores and Va represents the anodic oxidation voltage. This relational expression (U=0.0025Va ($\mu$m)) is disclosed in H. Masuda et al., "Jpn. J. Appl. Phys.", Vol. 37, 1998, pp. L1340–L1342, for example.

Figure 5:
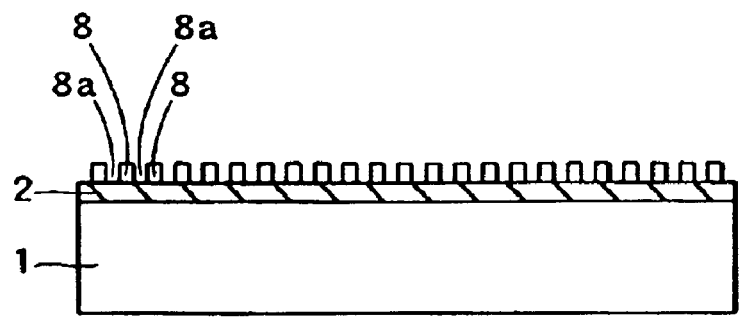
Figure 6:
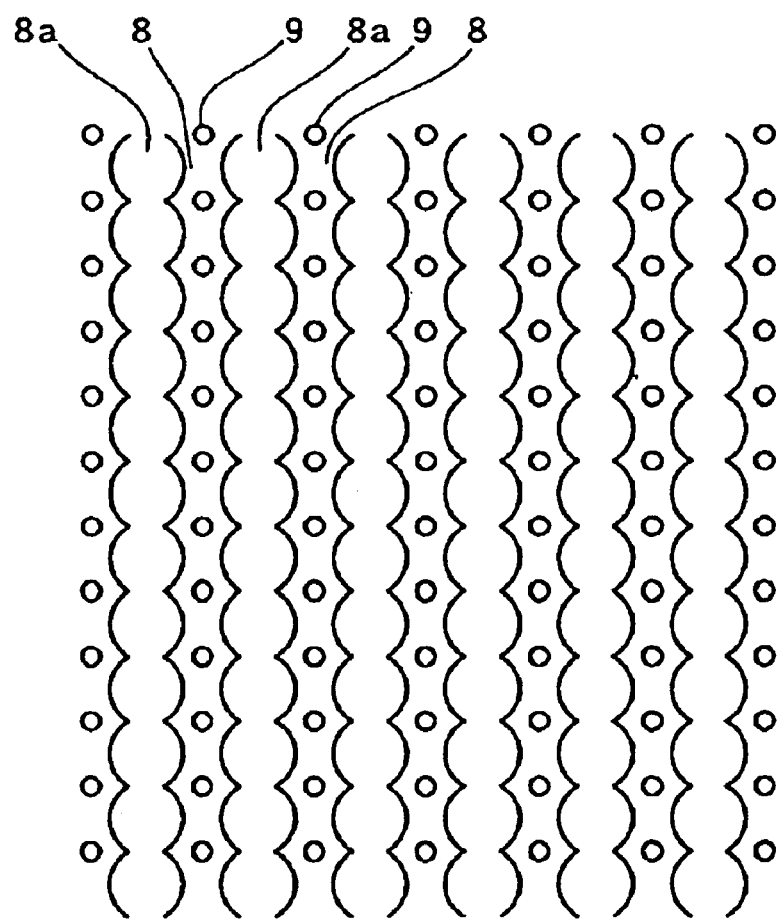
FIGS. 6 and 7 are plan views for illustrating the process of manufacturing the wave plate (polarization element) as the element having a microstructure according to the first embodiment of the present invention.
Figure 7:
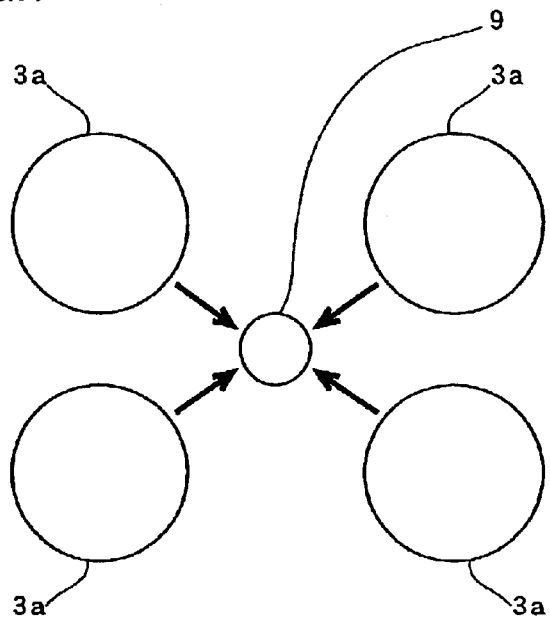

According to the first embodiment, pores corresponding to the dot columns formed by anodic oxidation are thereafter enlarged at about 30° C. by wet etching in an aqueous solution containing about 5 wt. % of phosphoric acid. At this time, adjacent ones of the pores corresponding to the dot columns are connected with each other due to the enlargement of the pores as shown in FIGS. 5 and 6, whereby portions of the aluminum oxide film 8 located on regions for forming grooves 8a can be easily substantially completely removed. Thus, the aluminum oxide (alumina) film 8 is formed with rectilinear grating groove patterns. The aluminum oxide film 8 is an example of the "metal oxide film" in the present invention. The grating groove patterns include the grooves 8a formed by rectilinearly coupling micropores with each other. The grooves 8a of the grating groove patterns are uniformly formed along the depth direction to reach the transparent electrode film 2. Pores 9 are formed on surface portions of the aluminum oxide film 8 located between the grooves 8a. As shown in FIG. 7, each pore 9 is conceivably formed on a position corresponding to each triangular lattice pattern 5 formed with no concave portion 3a due to influence by distortion of the concave portions 3a formed by texturing and distortion resulting from anodic oxidation.

According to the first embodiment, the dot columns of the concave portions 3a shown in FIG. 3 are formed on the surface of the aluminum film 3, which in turn is anodically oxidized in the state opposed to the surface of the cathode 6 consisting of platinum as hereinabove described, whereby the grating groove patterns can be easily formed by rectilinearly coupling the micropores with each other by conventional anodic oxidation for forming a micropore pattern.

According to the first embodiment, further, the grating groove patterns can be formed to include the grooves 8a having uniform widths in upper and lower portions through anodic oxidation, whereby the duty ratios on the upper and lower portions of the grating groove patterns can be uniformalized. Consequently, the effective refractive index can be excellently varied with light having a direction of polarization parallel to the extensional direction of the grating groove patterns and with light having a direction of polarization perpendicular to the extensional direction of the grating groove patterns, thereby forming a wave plate having an excellent birefringence property.

According to the first embodiment, further, the pores formed by anodic oxidation are enlarged by wet etching, whereby the grating groove patterns can be more easily formed by rectilinearly coupling the pores with each other.

Figure 8:
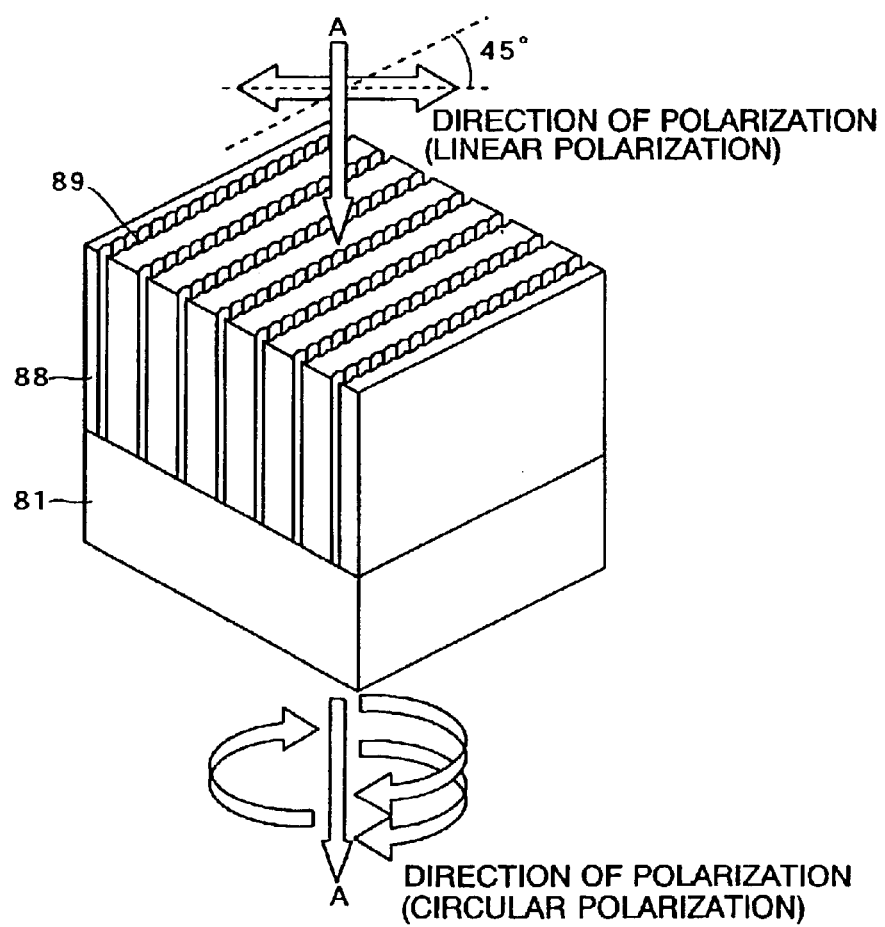
FIG. 8 is a perspective view showing the structure of a quarter-wave plate as an exemplary element (polarization element) having a microstructure according to the first embodiment of the present invention.

FIG. 8 is a perspective view showing the structure of a quarter-wave plate as an exemplary polarization element having a microstructure according to the aforementioned first embodiment. As shown in FIG. 8, a metal oxide film 88 having rectilinear grating groove patterns 89 according to the present invention is formed on a substrate 81. Linearly polarized light A inclined by about 45° with respect to the grating groove patterns 89 is converted to circularly polarized light A when perpendicularly incident upon the upper surface of the metal oxide film 88.

Figure 9:
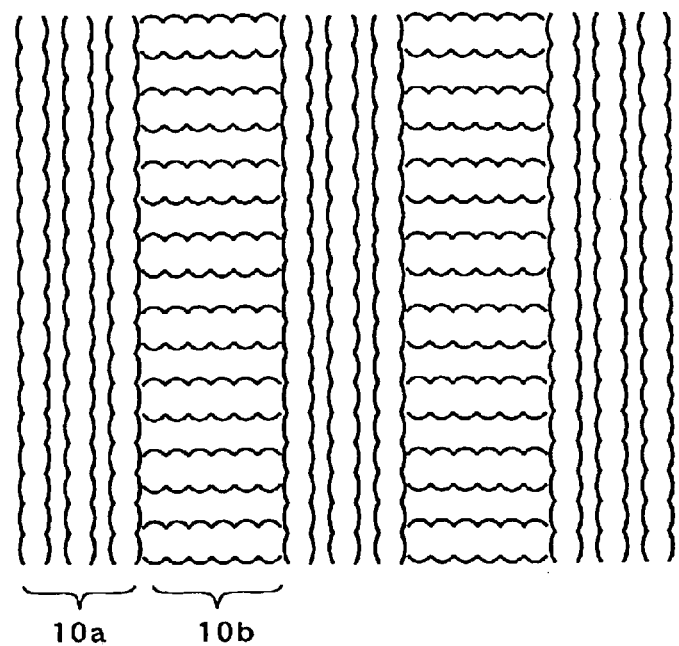
FIG. 9 is a plan view showing grating groove patterns of a polarization-dependent diffraction grating (polarization-dependent diffraction element) as an element having a microstructure according to a modification of the first embodiment.

FIG. 9 is a plan view showing a polarization-dependent diffraction grating according to a modification of the first embodiment. Referring to FIG. 9, rectilinear grating groove patterns 10a and rectilinear grating groove patterns 10b extending in a direction substantially perpendicular to the grating groove patterns 10a are alternately formed on the same glass substrate (not shown) through a process similar to the process of manufacturing a wave plate according to the aforementioned first embodiment in the polarization-dependent diffraction grating according to the modification of the first embodiment. The grating groove patterns 10a and 10b are examples of the "first groove pattern" and the "second groove pattern" in the present invention respectively. Thus, polarization-dependent diffraction gratings can be prepared on the glass substrate. When the duty ratios or the periods of the grating groove patterns 10a and 10b are adjusted, the effective refractive indices of the grating groove patterns 10a and 10b can be equalized with each other with respect to light having a direction of polarization perpendicular to the grating groove patterns 10a, for example, whereby the grating groove patterns 10a and 10b can be brought into a state (transparent) exhibiting no refractive index modulation only with respect to the direction of polarization perpendicular to the grating groove patterns 10a. Thus, an excellent extinction ratio can be obtained. Further, the grating groove patterns 10a and 10b can be so formed as to uniformalize the duty ratios on the upper and lower portions thereof similarly to the aforementioned first embodiment, whereby a further excellent extinction ratio can be obtained.

(Second Embodiment)

Figure 10:
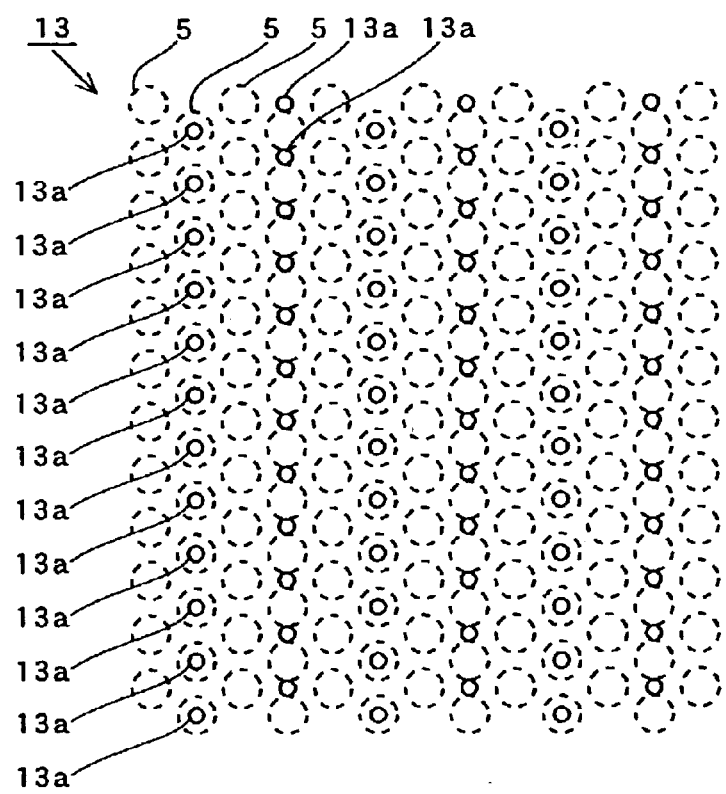
FIGS. 10 to 12 are plan views for illustrating a process of manufacturing grating groove patterns of a wave plate (polarization element) as an element having a microstructure according to a second embodiment of the present invention.
Figure 11:
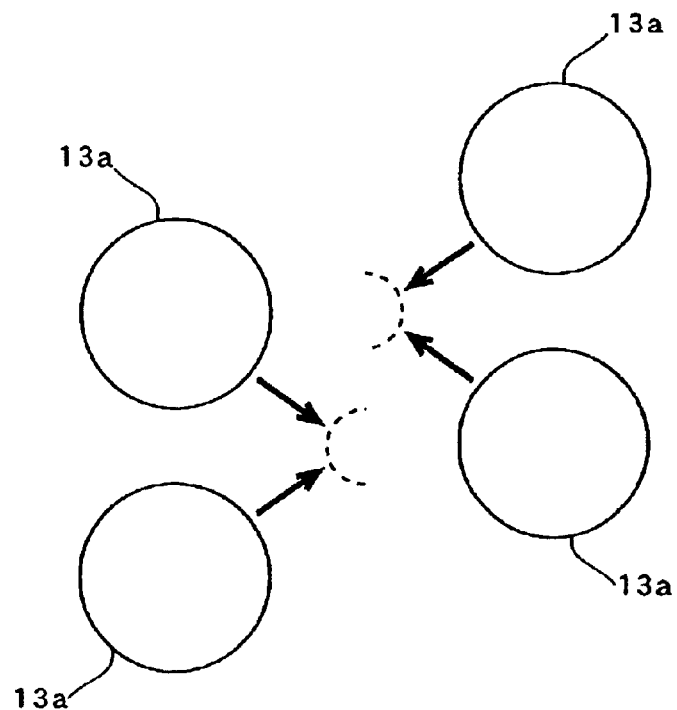
Figure 12:
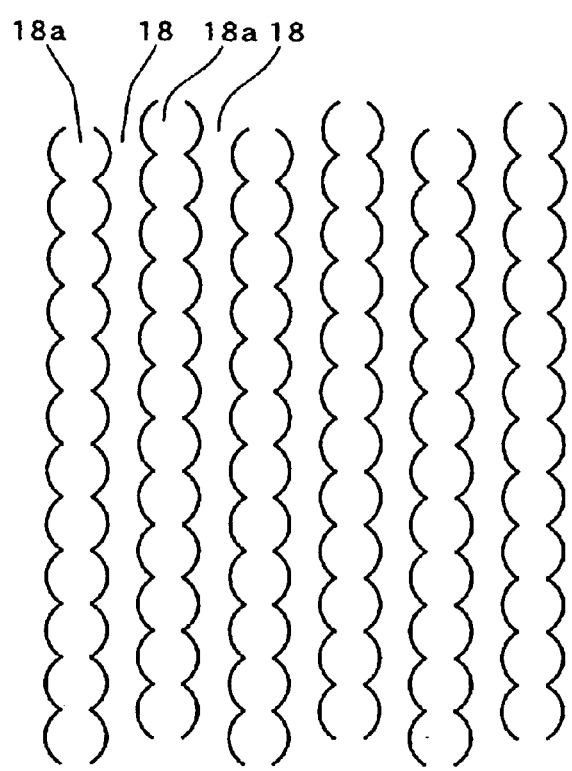

Referring to FIGS. 10 to 12, a manufacturing process according to a second embodiment of the present invention is similar to that according to the aforementioned first embodiment except that positions of dot columns of concave portions 13a formed on an aluminum film 13 by texturing are different from those in the first embodiment.

In the manufacturing process according to the second embodiment, texturing is so performed as to form the dot columns of the concave portions 13a on the surface of the textured aluminum film 13 every other column of triangular lattice patterns 5 arranged in a plurality of columns shown by broken lines while alternating adjacent ones of the dot columns of the concave portions 13a, as shown in FIG. 10. Thus, the dot columns of the concave portions 13a are formed on the surface of the aluminum film 13 in the arrangement shown in FIG. 10. The aluminum film 13 is an example of the "metal layer" in the present invention.

According to the second embodiment, the aluminum film 13 formed with the dot columns of the concave portions 13a thereafter is anodically oxidized, similarly to the aforementioned first embodiment. Thus, positions influenced by distortion of the concave portions 13a formed by texturing and those influenced by distortion resulting from anodic oxidation can be alternated as shown in FIG. 11 in the case of anodic oxidation of the aluminum film 13 formed with the dot columns of the concave portions 13a having the arrangement shown in FIG. 10. Thereafter wet etching is performed for enlarging micropores formed by anodic oxidation thereby forming grating groove patterns having no pores on surface portions of an aluminum oxide film 18 located between grooves 18a as shown in FIG. 12. Consequently, the refractive index is not changed by light incident upon pores formed in portions other than the grooves 18a, whereby a wave plate having a further excellent birefringence property can be formed as compared with the first embodiment. The aluminum oxide film 18 is an example of the "metal oxide film" in the present invention.

Other effects of the second embodiment are similar to those of the first embodiment.

(Third Embodiment)

Figure 13:
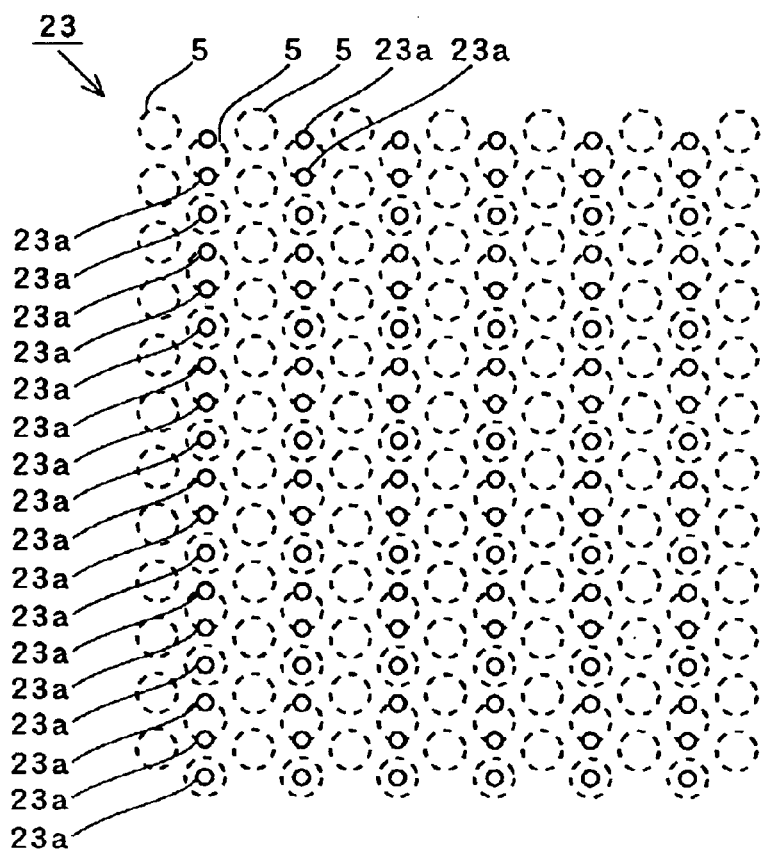
FIGS. 13 to 15 are plan views for illustrating a process of manufacturing grating groove patterns of a wave plate (polarization element) as an element having a microstructure according to a third embodiment of the present invention.
Figure 14:
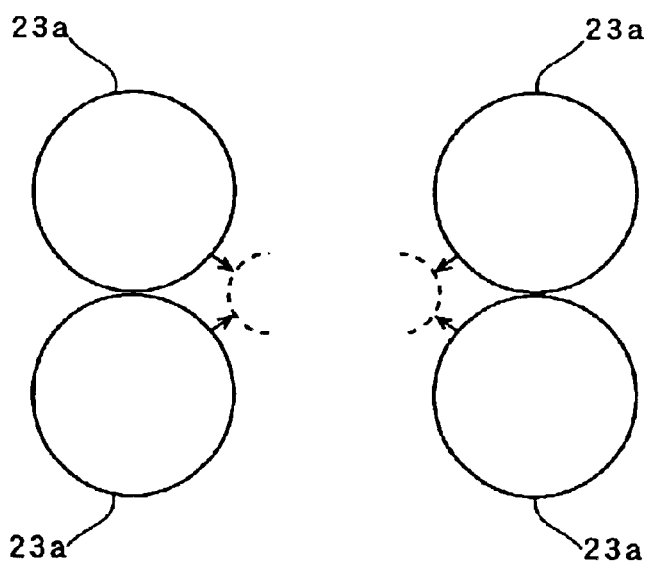
Figure 15:
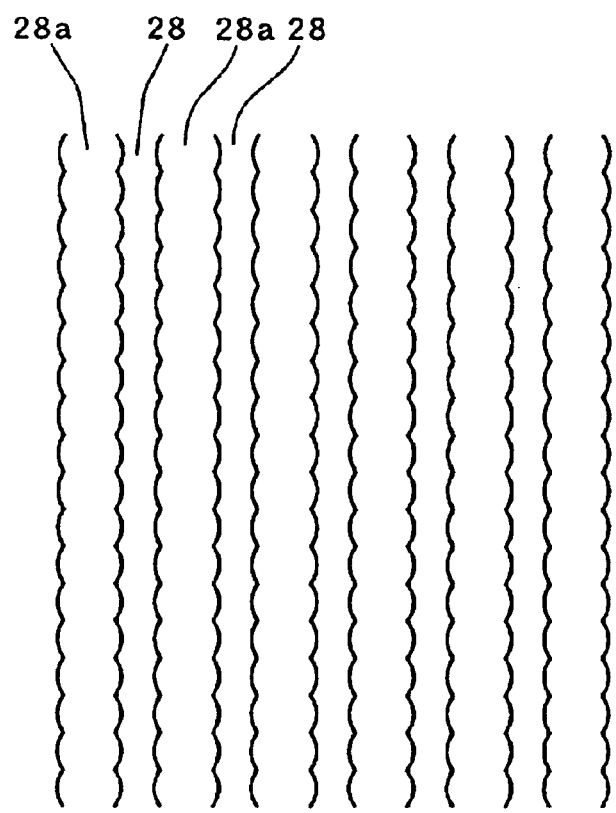

Referring to FIGS. 13 to 15, grating groove patterns are formed by rectilinearly coupling a larger number of micropores with each other in a manufacturing process according to a third embodiment of the present invention as compared with the aforementioned first and second embodiments.

In the process of manufacturing the grating groove patterns of a wave plate according to the third embodiment, positions of dot columns of concave portions 23a formed on an aluminum film 23 by texturing are different from those in the aforementioned first and second embodiments, as shown in FIG. 13. More specifically, texturing is so performed as to form the dot columns of the concave portions 23a every other column of triangular lattice patterns 5 arranged in a plurality of columns shown by broken lines so that the interval along the column direction is narrower than the interval between the triangular lattice patterns 5. The aluminum film 23 is an example of the "metal layer" in the present invention.

According to the third embodiment, the aluminum film 23 formed with the dot columns of the concave portions 23a is thereafter anodically oxidized similarly to the aforementioned first and second embodiments. Thus, positions influenced by distortion of the concave portions 23a formed by texturing and those influenced by distortion resulting from anodic oxidation can be separated from each other as shown in FIG. 14 in the case of anodic oxidation of the aluminum film 23 formed with the dot columns of the concave portions 23a having the arrangement shown in FIG. 13. Thereafter wet etching is performed for enlarging micropores formed by anodic oxidation, thereby forming the grating groove patterns with no pores formed in surface portions of an aluminum oxide film 28 located between grooves 28a as shown in FIG. 15. Consequently, the refractive index is not changed by light incident upon pores formed in portions other than the grooves 28a, whereby a wave plate having a further excellent birefringence property can be formed as compared with the first embodiment. The aluminum oxide film 28 is an example of the "metal oxide film" in the present invention.

Other effects of the third embodiment are similar to those of the first and second embodiments.

(Fourth Embodiment)

Referring to FIGS. 16 to 19, a manufacturing process according to a fourth embodiment of the present invention is now described with reference to grating groove patterns formed on a side surface of an aluminum oxide film 38 dissimilarly to the aforementioned first to third embodiments.

Figure 16:
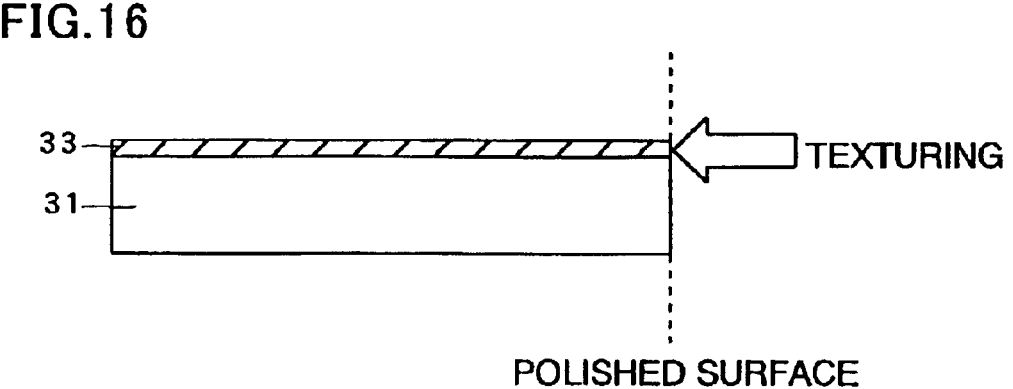
FIG. 16 is a sectional view for illustrating a process of manufacturing grating groove patterns of a wave plate (polarization element) as an element having a microstructure according to a fourth embodiment of the present invention.

In the process of manufacturing a wave plate according to the fourth embodiment, an aluminum film 33 having a thickness of about 3 µm is formed on a glass substrate 31 by vapor deposition, as shown in FIG. 16. The glass substrate 31 is an example of the "substrate" in the present invention, and the aluminum film 33 is an example of the "metal layer" in the present invention.

Figure 17:
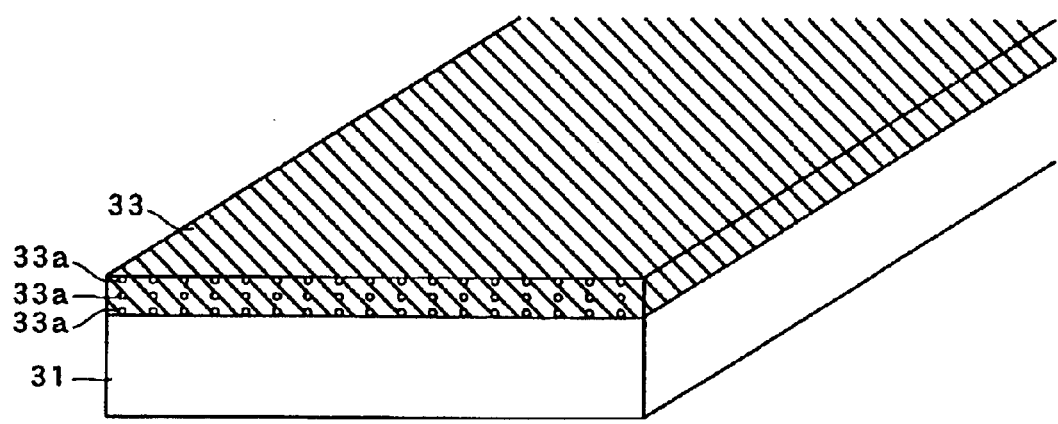
FIG. 17 is a perspective view for illustrating the process of manufacturing the grating groove patterns of the wave plate (polarization element) as the element having a microstructure according to the fourth embodiment of the present invention.

According to the fourth embodiment, a side surface of the aluminum film 33 is polished for performing texturing. As shown in FIG. 17, dot columns of concave portions 33a are formed on the side surface of the aluminum film 33 by texturing. The dot columns of the concave portions 33a are in arrangement similar to any of those according to the first, second and third embodiments shown in FIGS. 3, 10 and 12 respectively.

Figure 18:
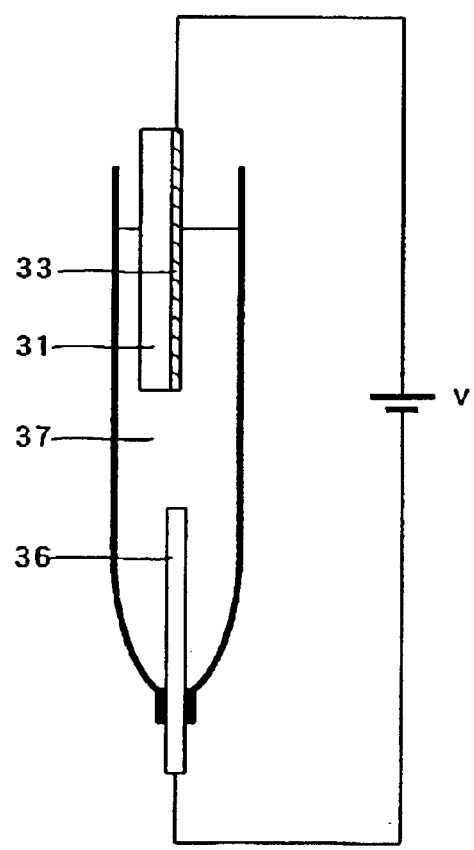
FIG. 18 is a sectional view for illustrating the process of manufacturing the grating groove patterns of the wave plate (polarization element) as the element having a microstructure according to the fourth embodiment of the present invention.
Figure 19:
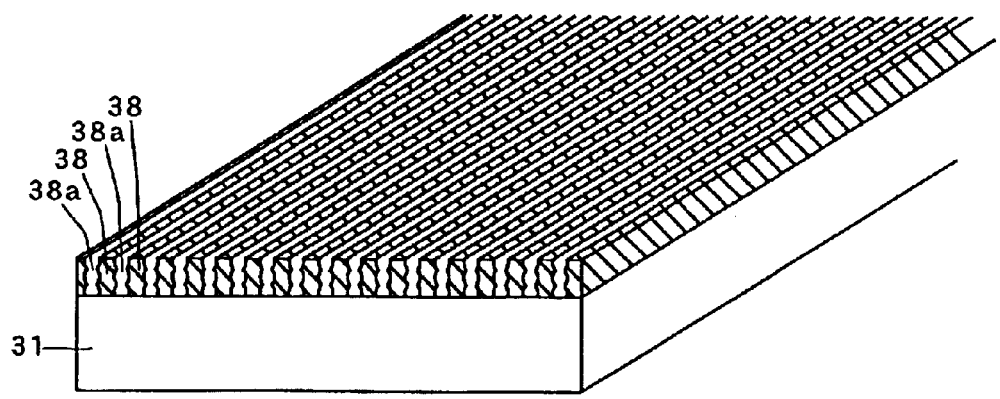
FIGS. 19 and 20 are perspective views for illustrating the process of manufacturing the grating groove patterns of the wave plate (polarization element) as the element having a microstructure according to the fourth embodiment of the present invention.

According to the fourth embodiment, the aluminum film 33 formed with the dot columns of the concave portions 33a is thereafter anodically oxidized thereby forming pores (not shown) corresponding to the dot columns, as shown in FIG. 18. More specifically, the side surface of the aluminum film 33 serving as an anode is opposed to a side surface of a cathode 36 consisting of platinum. A voltage of about 30 V is applied in aqueous sulfuric acid 37 of about 5% in concentration thereby performing oxidation for about 120 minutes. Thereafter pores corresponding to the dot columns formed by oxidation are enlarged by wet etching, similarly to the aforementioned first embodiment. At this time, portions of the aluminum oxide film 38 located on regions for forming grooves 38a are substantially completely removed, as shown in FIG. 19. Thus, the aluminum oxide film 38 having rectilinear grating groove patterns including the grooves 38a is formed in a self-organized manner. The aluminum oxide film 38 is an example of the "metal oxide film" in the present invention.

In the manufacturing process according to the fourth embodiment, the grating groove patterns can be easily formed by rectilinearly coupling micropores with each other by conventional anodic oxidation for forming a micropore pattern by forming the regularly arranged dot columns of the concave portions 33a on the side surface of the aluminum film 33 while oxidizing the side surface of the aluminum film 33 in the state opposed to the side surface of the cathode 36 consisting of platinum, as hereinabove described.

The grating groove patterns including the grooves 38a having uniform widths in upper and lower portions can be formed by anodic oxidation, whereby the duty ratios in the upper and lower portions of the grating groove patterns can be uniformalized. Consequently, the effective refractive index can be excellently varied with light having a direction of polarization parallel to the extensional direction of the grating groove patterns and with light having a direction of polarization perpendicular to the extensional direction of the grating groove patterns, thereby forming a wave plate having an excellent birefringence property.

According to the fourth embodiment, further, the grating groove patterns can be further easily formed by rectilinearly coupling the micropores with each other by enlarging the pores formed by anodic oxidation by wet etching.

(Fifth Embodiment)

Figure 20:
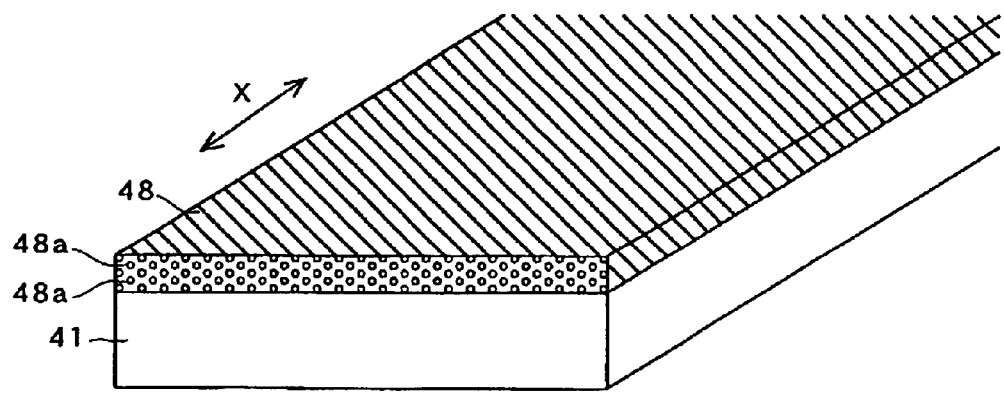

Referring to FIG. 20, an aluminum oxide film 48 having patterns of triangular lattice pores 48a extending in a direction X substantially parallel to the surface of a glass substrate 41 is formed in a manufacturing process according to a fifth embodiment of the present invention, dissimilarly to the aforementioned first to fourth embodiments. The glass substrate 41 is an example of the "substrate" in the present invention, and the aluminum oxide film 48 is an example of the "metal oxide film" in the present invention.

In the process of manufacturing a wave plate according to the fifth embodiment, triangular lattice patterns are formed by texturing, dissimilarly to the texturing according to the fourth embodiment shown in FIG. 17. The aluminum oxide film 48 having the patterns of the triangular lattice pores 48a extending in the direction X substantially parallel to the surface of the glass substrate 41 can be easily formed by thereafter carrying out a step similar to the anodic oxidation step according to the fourth embodiment shown in FIG. 18. When light is incident upon the wave plate formed according to the fifth embodiment perpendicularly to the surface of the aluminum oxide film 48, therefore, the effective refractive index can be varied with light having a direction of polarization parallel to the extensional direction of the patterns of the lattice pores 48a and with light having a direction of polarization perpendicular to the extensional direction of the patterns of the lattice pores 48a. Consequently, a wave plate having an excellent birefringence property can be easily formed.

(Sixth Embodiment)

Referring to FIGS. 21 to 26, a manufacturing process according to a sixth embodiment of the present invention is described with reference a case of forming grating groove patterns by periodically forming mask layers 54 on an aluminum film 53 and thereafter performing oxidation without texturing dissimilarly to the aforementioned first to fifth embodiments.

Figure 21:
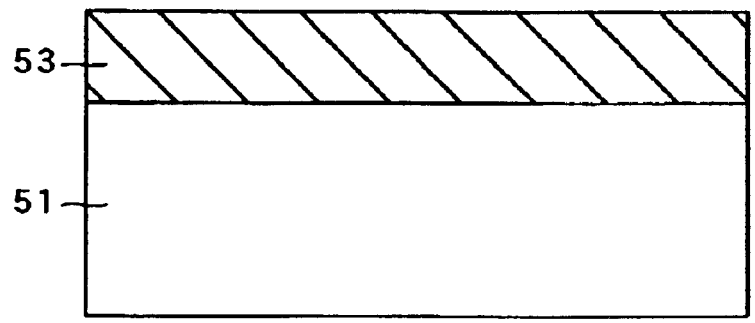
FIGS. 21 to 23 are sectional views for illustrating a process of manufacturing grating groove patterns of a wave plate (polarization element) as an element having a microstructure according to a sixth embodiment of the present invention.

According to the sixth embodiment, the aluminum film 53 having a prescribed thickness is formed on a transparent substrate 51 consisting of quartz or the like by electron beam evaporation or sputtering, as shown in FIG. 21. The transparent substrate 51 is an example of the "substrate" in the present invention, and the aluminum film 53 is an example of the "metal layer" in the present invention.

Figure 22:
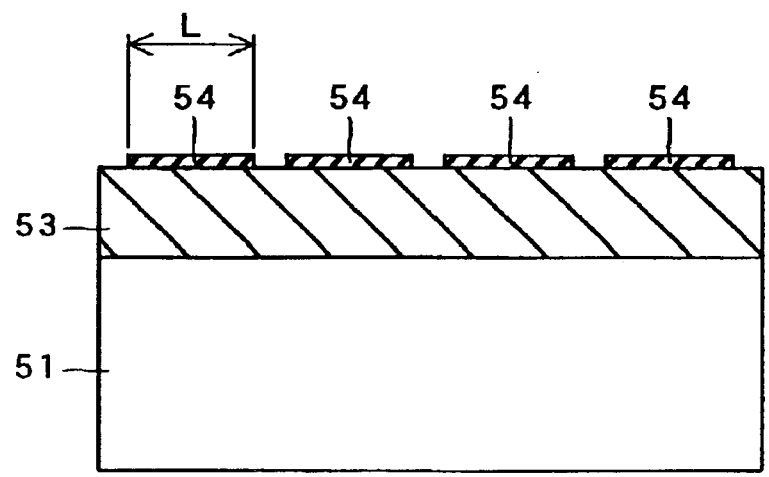

According to the sixth embodiment, the mask layers 54 of Ni having a thickness of about 0.1 μm and a width L of about 0.25 μm are periodically formed on the aluminum film 53 by a lift-off method at an interval of about 0.1 μm, as shown in FIG. 22. More specifically, a resist film (not shown) is formed on the overall surface of the aluminum film 53 and thereafter periodically patterned at an interval of about 0.25 μm to have a width of about 0.1 μm (period: 0.35 μm) using electron beam lithography, reducing projection pattern exposure, or two light beam interference technique. Thereafter an Ni layer (not shown) having a thickness of about 0.1 μm is formed to cover the resist film, and the resist film and the Ni layer located on the resist film are thereafter removed. Thus, the mask layers 54 of Ni having the thickness of about 0.1 μm and the width L of about 0.25 μm are periodically formed at the interval of about 0.1 μm.

Figure 23:
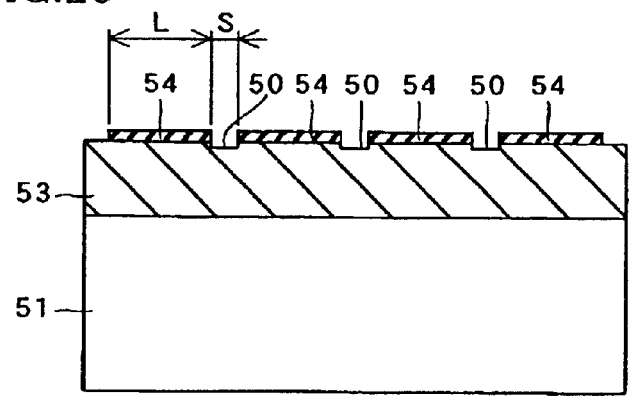

As shown in FIG. 23, the mask layers 54 are employed as masks for partially removing the aluminum film 53 up to a depth of about 0.1 μm from the upper surface thereof by dry etching, thereby forming etching grooves 50 having a width S of about 0.1 μm and a depth of about 0.1 μm. The etching grooves 50 are so formed as to easily cause field distortion in steps thereof in an anodic oxidation step described later. Therefore, micropores are easily formed in regions causing field distortion, whereby accuracy in positions for forming the micropores can be improved.

Then, the aluminum film 53 is anodically oxidized similarly to the anodic oxidation step according to the first embodiment shown in FIG. 4. According to the sixth embodiment, however, oxidation is performed employing an electrolyte dissolving oxalic acid of about 0.1 mol in concentration and applying a voltage of about 100 V at a temperature of about 3° C. Thus, an aluminum oxide film 58 having micropores 53a and 53b is formed in a self-organized manner, as shown in FIG. 23. The pores 53a and 53b are formed on the boundaries between the etching grooves 50 and regions 54a formed with the mask layers 54 to form triangular lattices (regions F enclosed with broken lines in FIG. 24). The aluminum oxide film 58 is an example of the "metal oxide film" in the present invention. The mask layers 54 of Ni are also oxidized at this time.

Figure 24:
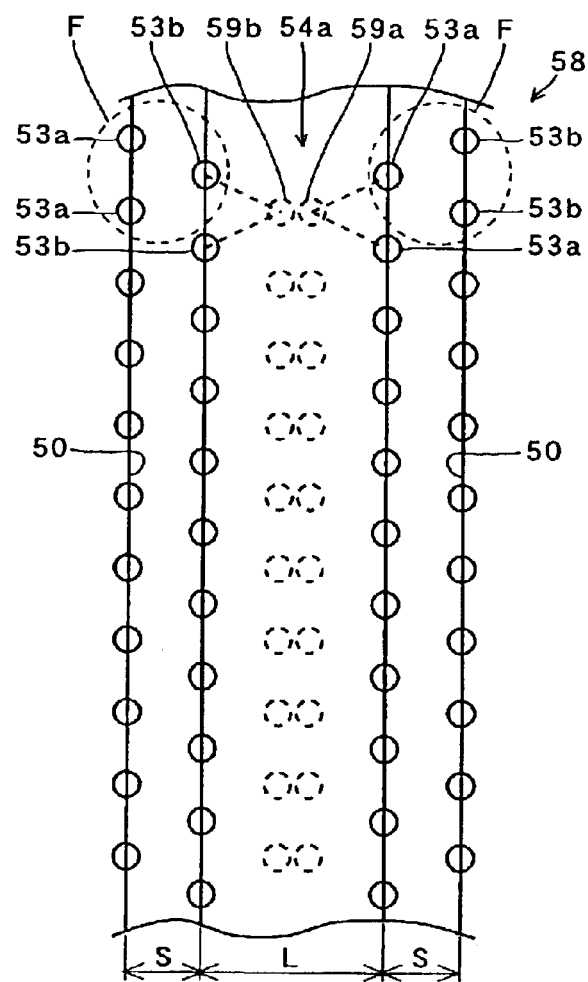
FIG. 24 is a plan view for illustrating positions of pores formed upon oxidation.

In relation to pores formed by anodic oxidation, it is known that a relational expression U=0.0025Va (μm) holds assuming that U represents the maximum distance between adjacent pores and Va represents the anodic oxidation voltage. In order to form the pores 53a and 53b on the boundaries between the etching grooves 50 and the regions 54a formed with the mask layers 54 as shown in FIG. 24, the anodic oxidation voltage Va must be set to satisfy a relational expression $0.866U \geq S$. This relational expression ($0.866U \geq S$) can be derived from $U=(2/\sqrt{3}) \times S$ from the relation of a triangular ratio. According to the sixth embodiment, the maximum distance U between the adjacent ones of the pores 53a and 53b is about 0.25 μm and the width S of the etching grooves 50 is about 0.1 μm, to satisfy the relational expression $0.866U \geq S$. Thus, the pores 53a and 53b can be formed on the boundaries between the etching grooves 50 and the regions 54a formed with the mask layers 54.

In order to form excellent grating groove patterns, it is important to form no pores in the regions 54a formed with the mask layers 54, i.e., regions other than those formed with grooves 58a (see FIG. 25) of the grating groove patterns described later. When virtual positions 59a and 59b for forming the triangular lattices with the pores 53a and 53b respectively coincide with each other in the regions 54a formed with the mask layers 54 as shown in FIG. 24, pores may be formed in anodic oxidation regardless of the mask layers 54. Therefore, the regions 54a formed with the mask layers 54 can be prevented from forming pores by preventing the virtual positions 59a and 59b from coinciding with each other. Thus, the width L of the mask layers 54 and the width S of the etching grooves 50 must be set to satisfy a relational expression $L \neq 2S$. According to the sixth embodiment, the width L of the mask layers 54 is about 0.25 μm and the width S of the etching grooves 50 is about 0.1 μm, to satisfy the relational expression $L \neq 2S$.

The width L of the mask layers 54 must be further set to also satisfy a relational expression $U \geq L$, to be not more than the maximum distance U between adjacent ones of the pores 53a and 53b. If the width L does not satisfy this condition (U<L), the pores 53a and 53b located on both ends of the mask layers 54 gradually approach to each other as growing in the depth direction, such that the distance therebetween reaches the value U. Therefore, the pores 53a and 53b cannot be formed rectilinearly in the depth direction. According to the sixth embodiment, the maximum distance U between the adjacent ones of the pores 53a an 53b is about 0.25 μm and the width L of the mask layers 54 is about 0.25 μm, to also satisfy the relational expression $U \geq L$.

Figure 25:
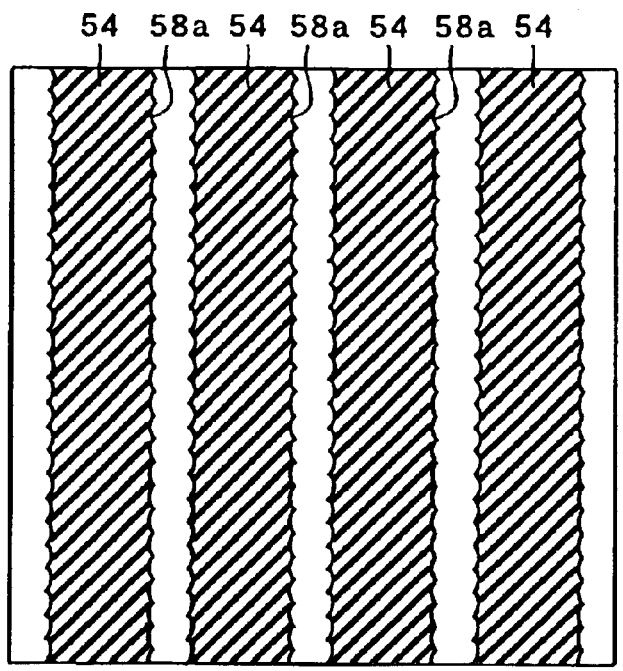
FIG. 25 is a plan view for illustrating the process of manufacturing the grating groove patterns of the wave plate (polarization element) as the element having a microstructure according to the sixth embodiment of the present invention.
Figure 26:
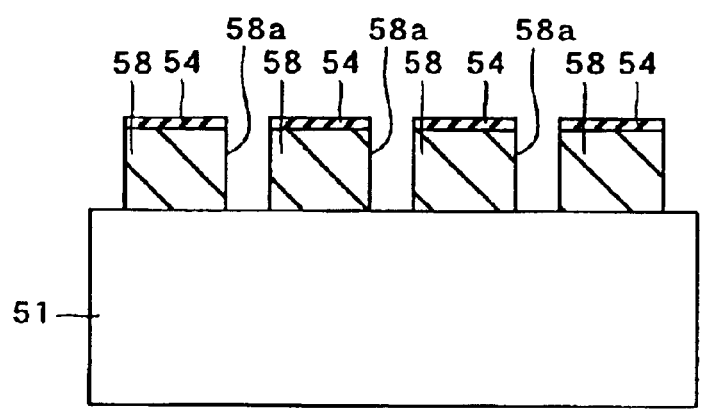
FIG. 26 is a sectional view for illustrating the process of manufacturing the grating groove patterns of the wave plate (polarization element) as the element having a microstructure according to the sixth embodiment of the present invention.

According to the sixth embodiment, the pores 53a and 53b are enlarged by wet etching through the mask layers 54 with an aqueous solution containing phosphoric acid by about 5 wt. % at a temperature of about 30° C. At this time, the pores 53a and 53b (see FIG. 23) are so enlarged that adjacent ones thereof are connected with each other as shown in FIGS. 25 and 26, whereby portions of the aluminum oxide film 58 located on the regions formed with the grooves 58a can be easily substantially completely removed. An Ni oxide forming the mask layers 54 is excellent in durability against aqueous phosphoric acid. Therefore, pores, which may be formed on the regions 54a (see FIG. 24) formed with the mask layers 54, can be prevented from etching. Thus, the aluminum oxide film 58 is formed with rectilinear grating groove patterns provided on regions other than the regions 54a formed with the mask layers 54. The grating groove patterns include the grooves 58a formed by rectilinearly coupling the pores 53a and 53b with each other. The grooves 58a of the grating groove patterns are formed uniformly in the depth direction to reach the transparent substrate 51.

According to the present invention, rectilinear grating groove patterns having a large depth with a uniform groove width along the depth direction can be easily formed in a self-organized manner only on regions formed with no mask layers 54 by periodically forming the mask layers 54 on the aluminum film 53 and thereafter anodically oxidizing the aluminum film 53 thereby forming the aluminum oxide film 58 having rectilinear grating groove patterns. Consequently, a wave plate having an excellent birefringence property can be easily formed. Further, the portions, i.e., the regions 54a formed with the mask layers 54, other than the grooves 58a of the grating groove patterns can be prevented from forming pores, whereby the refractive index is not changed by light incident upon pores formed in the portions other than the grooves 58a of the grating groove patterns.

A polarization-dependent diffraction grating according to a modification of the sixth embodiment is described with reference to FIGS. 27 to 29. Referring to FIG. 29, the vertical axis shows the effective refractive index, and the horizontal axis shows a period P. Referring to FIG. 29, further, symbol TE denotes light having a direction of polarization parallel to the extensional direction of grating groove patterns, and symbol TM denotes light having a direction of polarization perpendicular to the extensional direction of the grating groove patterns.

Figure 27:
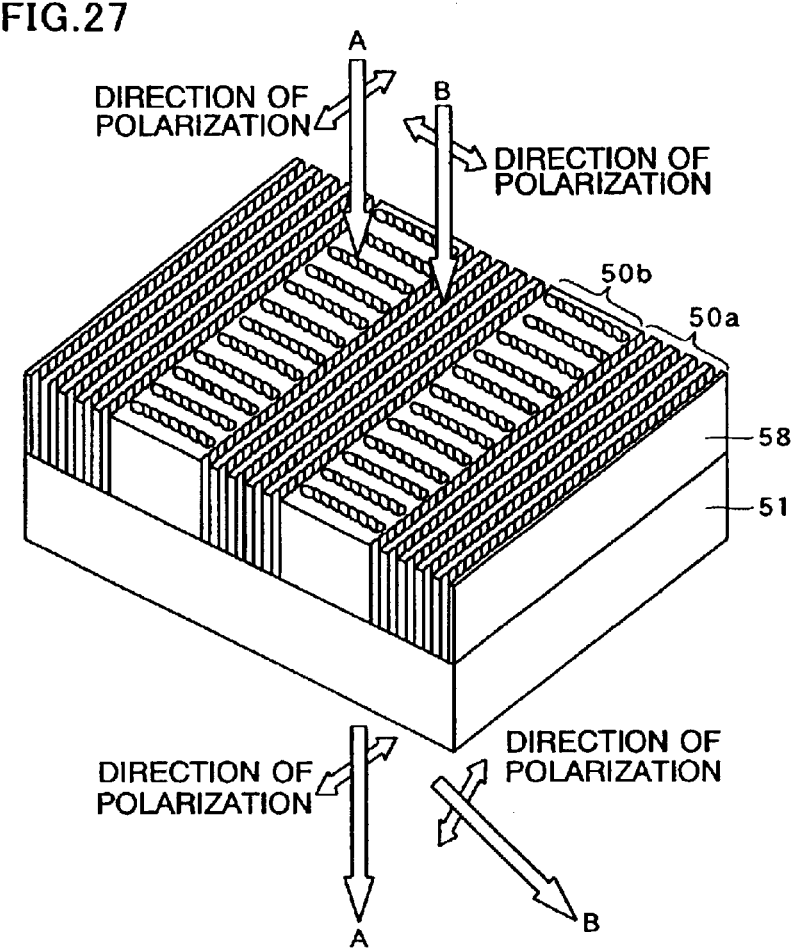
FIG. 27 is a perspective view showing a polarization-dependent diffraction grating (polarization-dependent diffraction element) as an element having a microstructure according to a modification of the sixth embodiment.
Figure 28:
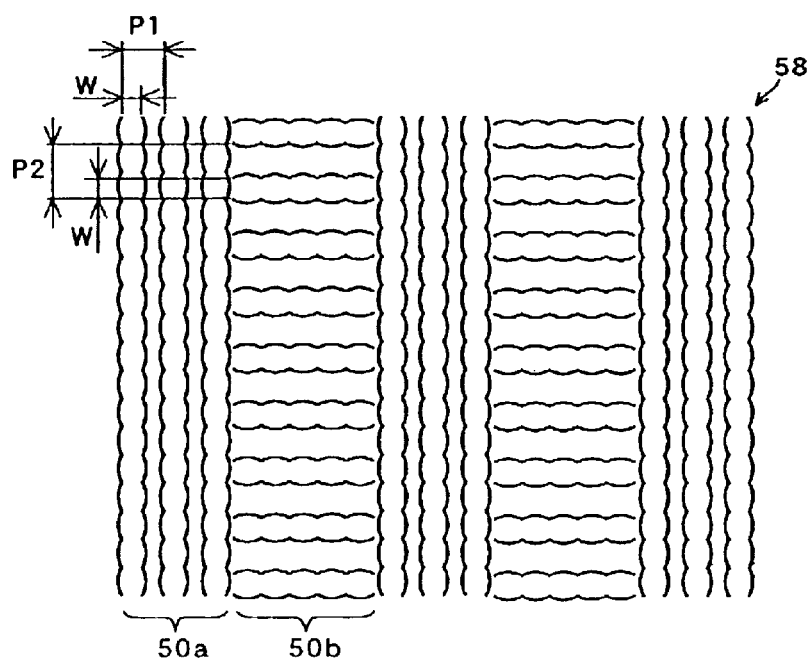
FIG. 28 is a plan view showing grating groove patterns of the polarization-dependent diffraction grating according to the sixth embodiment shown in FIG. 27.
Figure 29:
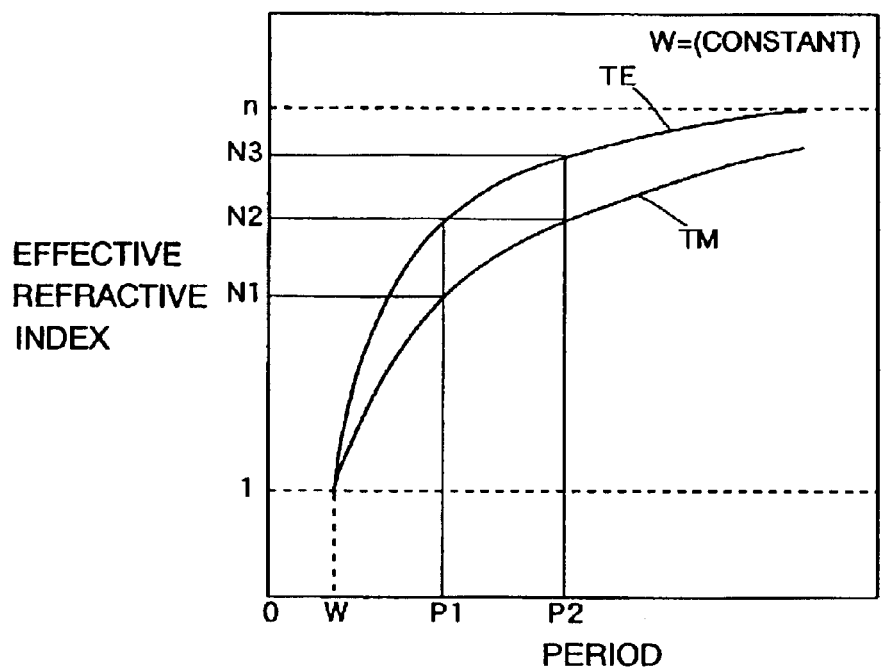
FIG. 29 is a correlation diagram showing the relation between the effective refractive index and the period of the polarization-dependent diffraction grating according to the sixth embodiment shown in FIG. 27.
Figure 47:
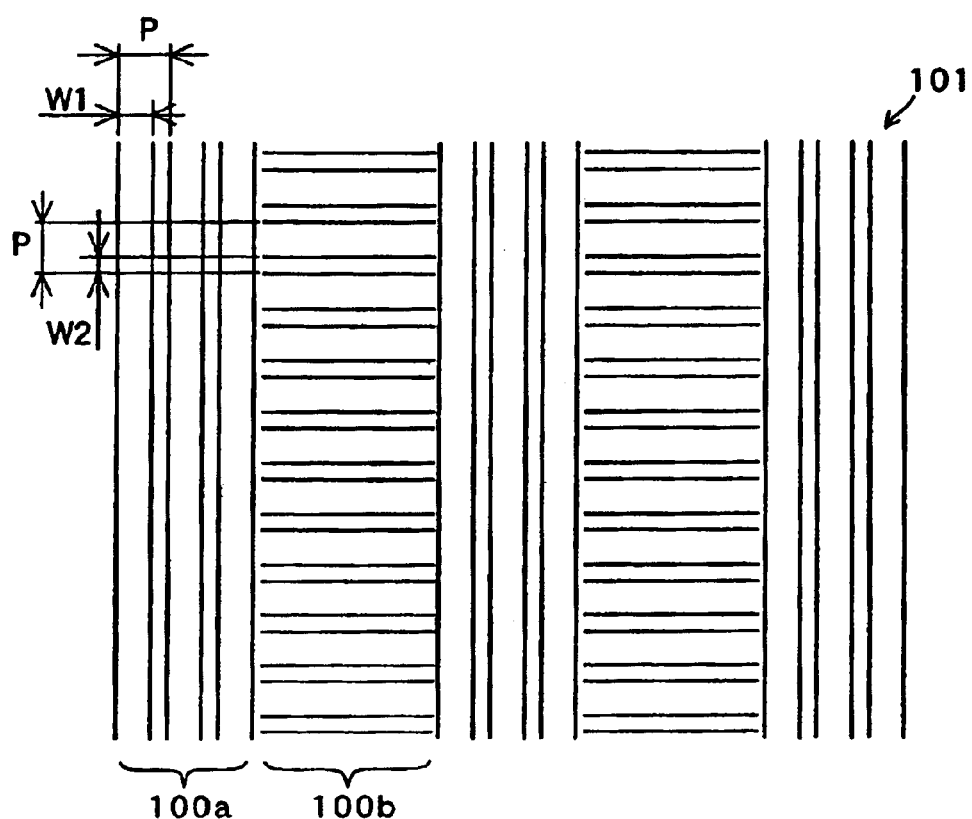
FIG. 47 is a plan view showing grating groove patterns of a polarization-dependent diffraction grating (polarization-dependent diffraction element) as another exemplary conventional element having a microstructure.
Figure 48:
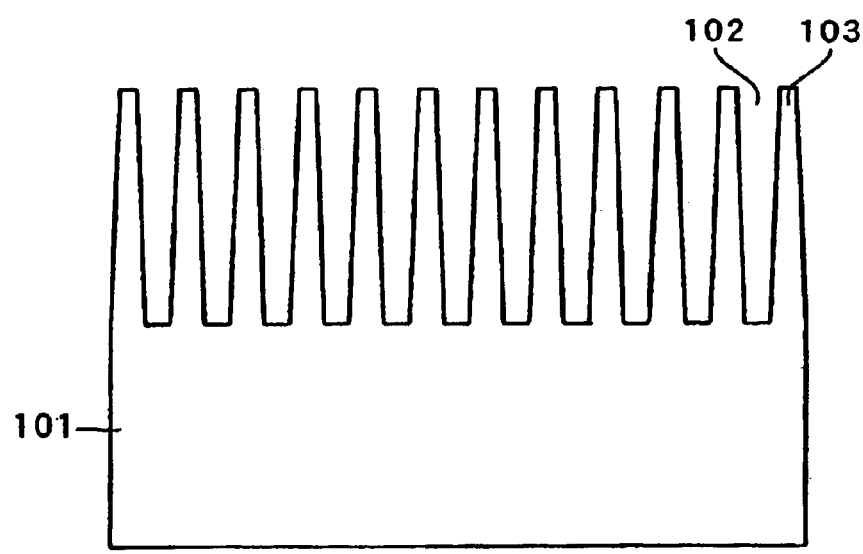
FIG. 48 is a sectional view of a conventional element having grating groove patterns formed by photolithography and etching.
Figure 49:
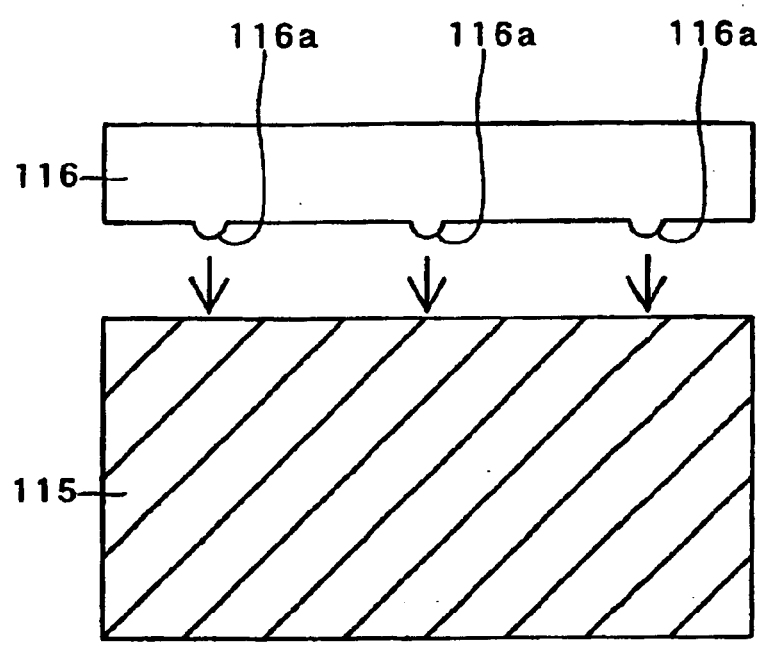
FIGS. 49 to 52 are sectional views for illustrating a conventional process of manufacturing a triangular lattice pattern by anodic oxidation.
Figure 50:
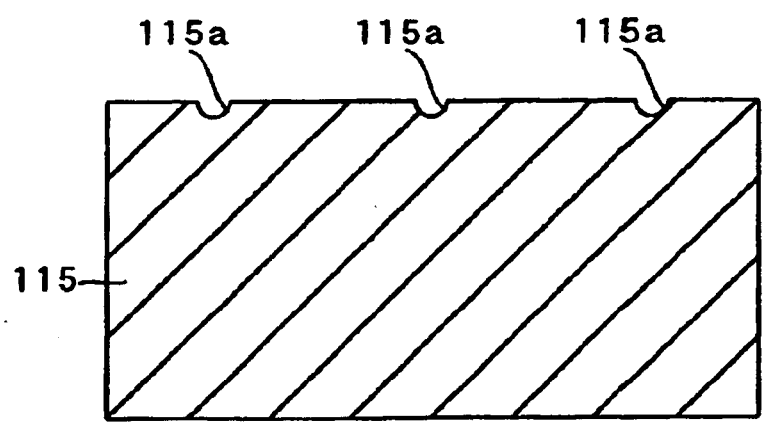
Figure 51:
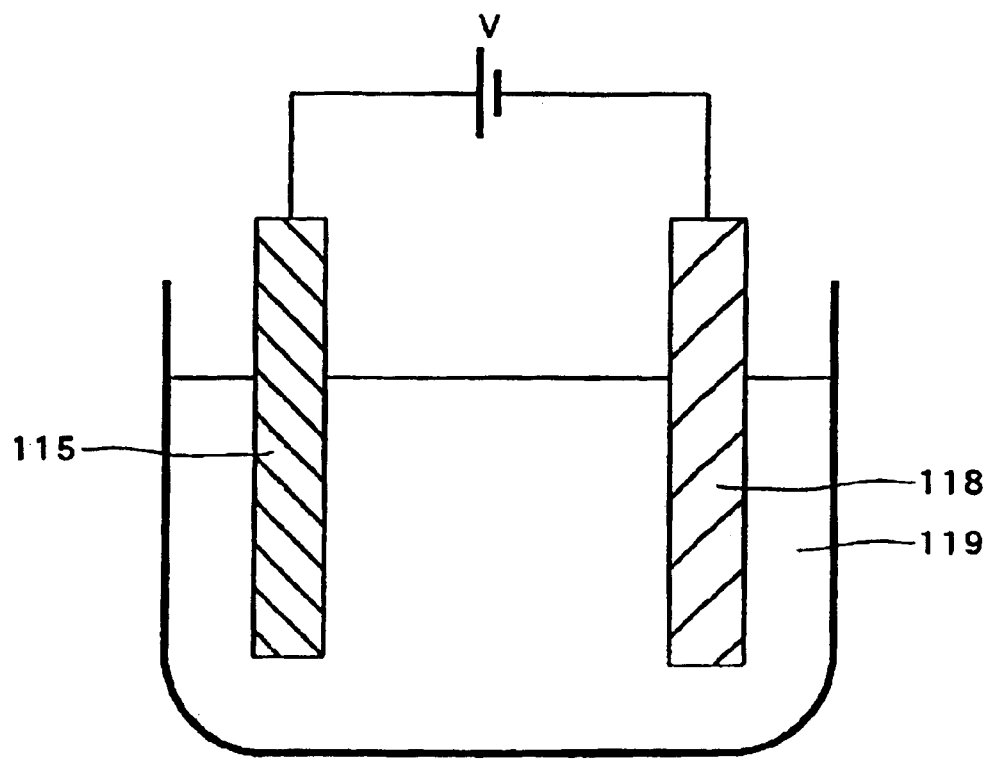
Figure 52:
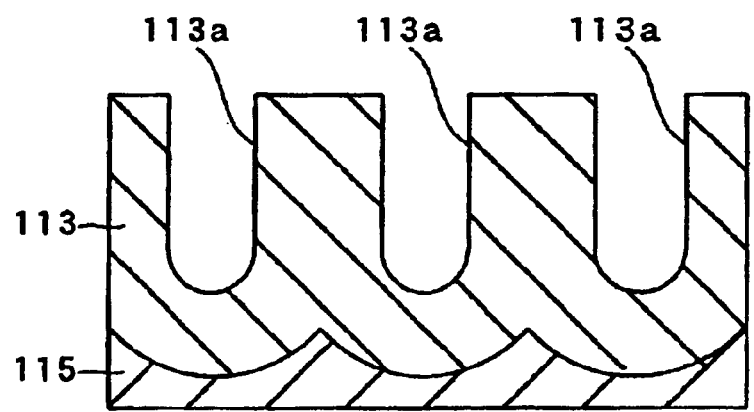
Figure 53:
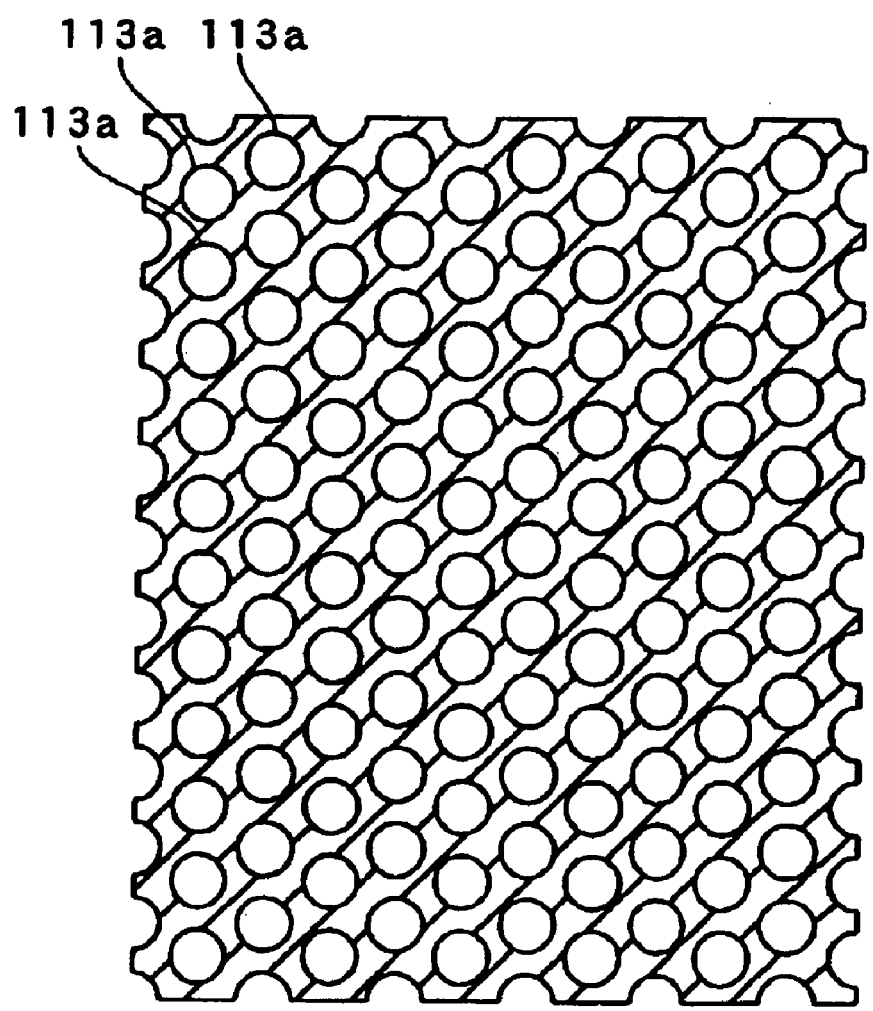
FIG. 53 is a plan view showing a conventional two-dimensional photonic crystal formed by anodic oxidation.

FIGS. 27 to 29 shows the polarization-dependent diffraction grating according to the modification of the sixth embodiment. In this polarization-dependent diffraction grating, an aluminum oxide film 58 having rectilinear grating groove patterns 50a and rectilinear grating groove patterns 50b extending in a direction substantially perpendicular to the grating groove patterns 50a is formed on a transparent substrate 51 through a manufacturing process similar to the process of manufacturing a wave plate according to the aforementioned sixth embodiment. The grating groove patterns 50a and 50b are alternately formed. The grating groove patterns 50a and 50b are examples of the "first groove pattern" and the "second groove pattern" in the present invention respectively. These grating groove patterns 50a and 50b have periods P1 and P2 respectively with grooves of the same width W. In the modification of the sixth embodiment, the polarization-dependent diffraction grating is prepared by adjusting the periods P1 and P2 without adjusting the groove width W, dissimilarly to the conventional polarization-dependent diffraction grating shown in FIG. 47.

When light A having a direction TE of polarization parallel to the grating groove patterns 50a having the period P1 is incident, the direction of polarization of this light A is a direction TM of polarization perpendicular to the grating groove patterns 50b in the grating groove patterns 50b having the period P2. Therefore, the effective refractive indices of the grating groove patterns 50a and 50b having the periods P1 and P2 respectively correspond to N2. When light B having the direction TM of polarization perpendicular to the grating groove patterns 50a having the period P1 is incident, on the other hand, the direction of this light B is the direction TE of polarization parallel to the grating groove patterns 50b in the grating groove patterns 50b having the period P2. Therefore, the effective refractive indices of the grating groove patterns 50a and 50b having the periods P1 and P2 correspond to N1 and N3 respectively. Thus, the effective refractive indices of the grating groove patterns 50a and 50b having the periods P1 and P2 can be equally set to the value N2 with respect to the light A having the direction TE of polarization parallel to the grating groove patterns 50a, whereby the grating groove patterns 50a and 50b can be brought into a state (transparent) exhibiting no refractive index modulation only with respect to the light A.

According to the modification of the sixth embodiment, the polarization-dependent diffraction grating can be prepared without adjusting the width W of the grooves of the grating groove patterns 50a and 50b as hereinabove described, whereby the polarization-dependent diffraction grating can be easily prepared through the manufacturing process according to the sixth embodiment allowing easy formation of grating groove patterns having uniform widths. Similarly to the aforementioned sixth embodiment, the rectilinear grating groove patterns 50a and 50b can be formed to have a large depth with a uniform groove width along the depth direction, whereby an excellent extinction ratio can be attained.

(Seventh Embodiment)

Referring to FIGS. 30 to 34, a manufacturing process according to a seventh embodiment of the present invention is described with reference to a case of oxidizing an aluminum film before forming mask layers 54, dissimilarly to the aforementioned sixth embodiment.

Figure 30:
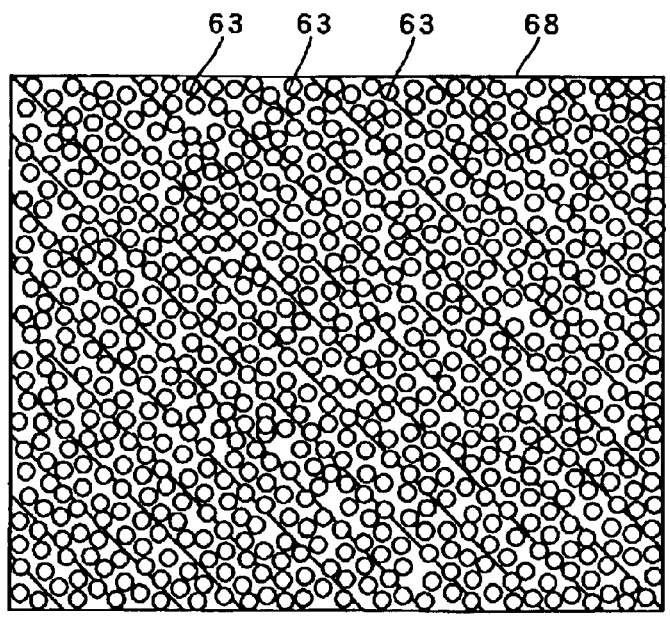
FIGS. 30 and 31 are plan views for illustrating a process of manufacturing grating groove patterns of a wave plate (polarization element) as an element having a microstructure according to a seventh embodiment of the present invention.

According to the seventh embodiment, the aluminum film (not shown) formed on a glass substrate 51 (see FIG. 32) by electron beam evaporation or sputtering is anodically oxidized similarly to the anodic oxidation step according to the first embodiment shown in FIG. 4. In the anodic oxidation step according to the seventh embodiment, however, a voltage of about 30 V to about 50 V lower than the applied voltage (about 100 V) in the aforementioned sixth embodiment is applied. Thus, an aluminum oxide film 68 is formed with pores 63 smaller in diameter and separation than the pores 53a and 53b in the sixth embodiment shown in FIG. 24, as shown in FIG. 30. The pores 63 are formed at random along the overall region of the aluminum oxide film 68. The aluminum oxide film 68 is an example of the "metal oxide film" in the present invention.

Figure 31:
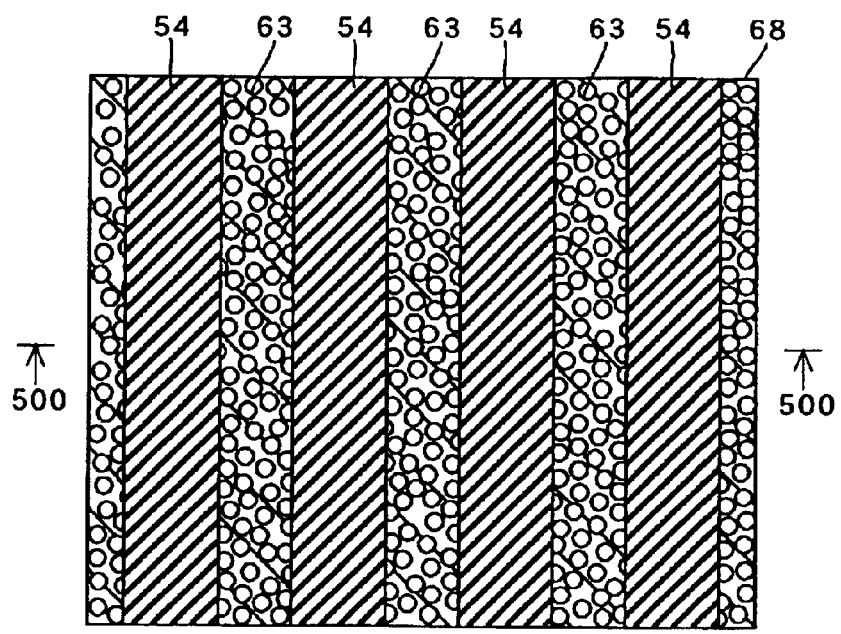
Figure 32:
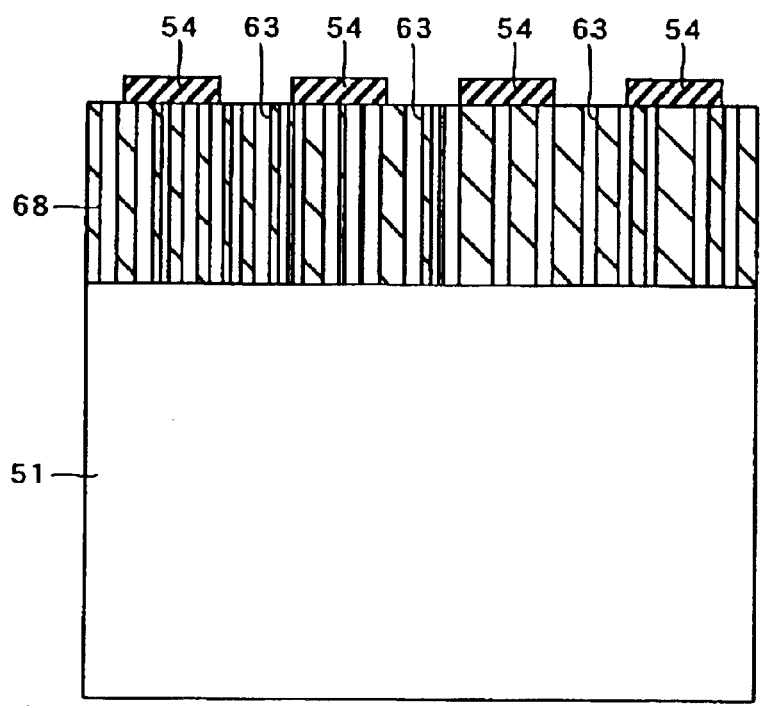
FIG. 32 is a sectional view taken along the line 500—500 in FIG. 31.
Figure 33:
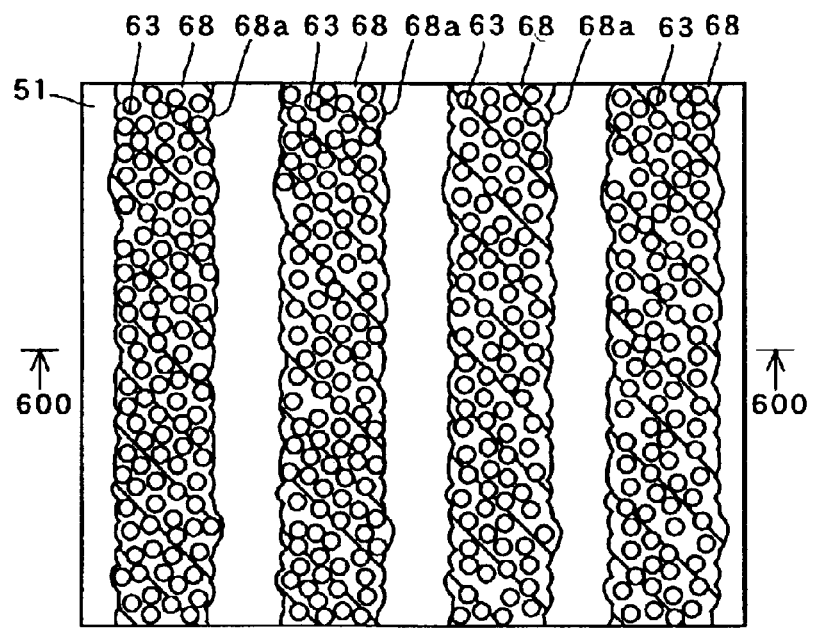
FIG. 33 is a plan view for illustrating the process of manufacturing the grating groove patterns of the wave plate (polarization element) as the element having a microstructure according to the seventh embodiment of the present invention.
Figure 34:
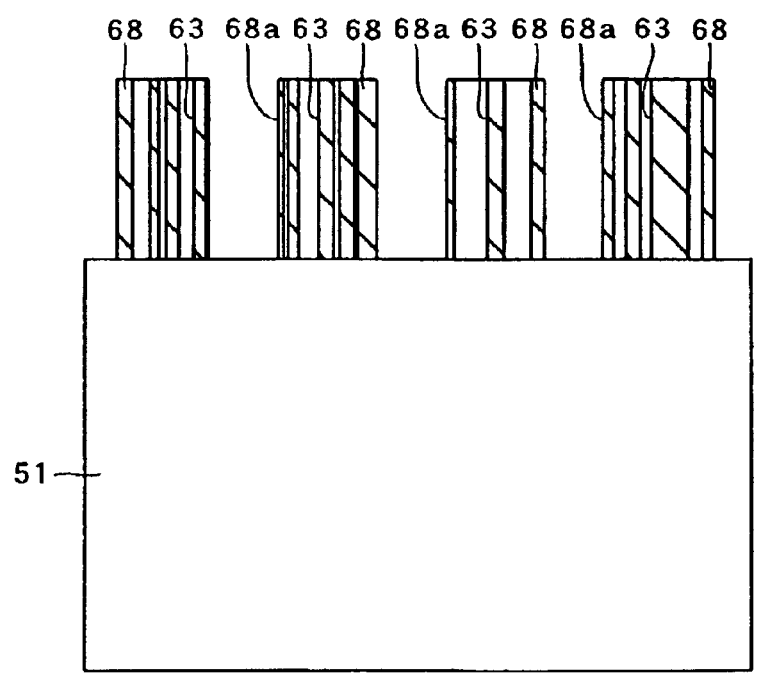
FIG. 34 is a sectional view taken along the line 600—600 in FIG. 33.

According to the seventh embodiment, the mask layers 54 are thereafter periodically formed on the aluminum oxide film 68 through a process similar to the step according to the sixth embodiment shown in FIG. 22, as shown in FIGS. 31 and 32. Thereafter the mask layers 54 are employed as masks for enlarging the pores 63 by wet etching under conditions similar to those in the aforementioned sixth embodiment. At this time, adjacent ones of the pores 63 are connected with each other due to enlargement of the pores 63 located on regions other than those formed with the mask layers 54 as shown in FIGS. 33 and 34, whereby portions of the aluminum oxide film 68 located on regions formed with grooves 68a can be easily substantially completely removed. Thus, the aluminum oxide film 68 is formed with rectilinear grating groove patterns. The grating groove patterns include the grooves 68a formed by coupling the pores 63 with each other as a belt. The grooves 68a of the grating groove patterns are formed uniformly along the depth direction to reach the transparent substrate 51.

According to the seventh embodiment, the aluminum film is anodically oxidized thereby forming the aluminum oxide film 68 having the micropores 63 and the mask layers 54 are thereafter formed on the aluminum oxide film 68 for enlarging the micropores 63 formed in the regions formed with no mask layers 54 by etching through masks of the mask layers 54 as hereinabove described, whereby the rectilinear grating groove patterns having a large depth with a uniform groove width along the depth direction can be formed only in the regions formed with no mask layers 54. Consequently, a wave plate having a birefringence property can be easily formed.

According to the seventh embodiment forming the grooves 68a of the grating groove patterns by rectilinearly coupling the pores 63 formed at random with each other, the dimensional accuracy of the grooves 68a is hard to improve. However, positions for forming the pores 63 in the aluminum oxide film 68 may not be set and hence the anodic oxidation step can be inhibited from complication.

Referring to FIGS. 35 to 39, a modification of the seventh embodiment is described with reference to a case of forming an aluminum oxide film 78 having pores arranged in the form of triangular lattices in a self-organized manner dissimilarly to the aforementioned seventh embodiment.

Figure 35:
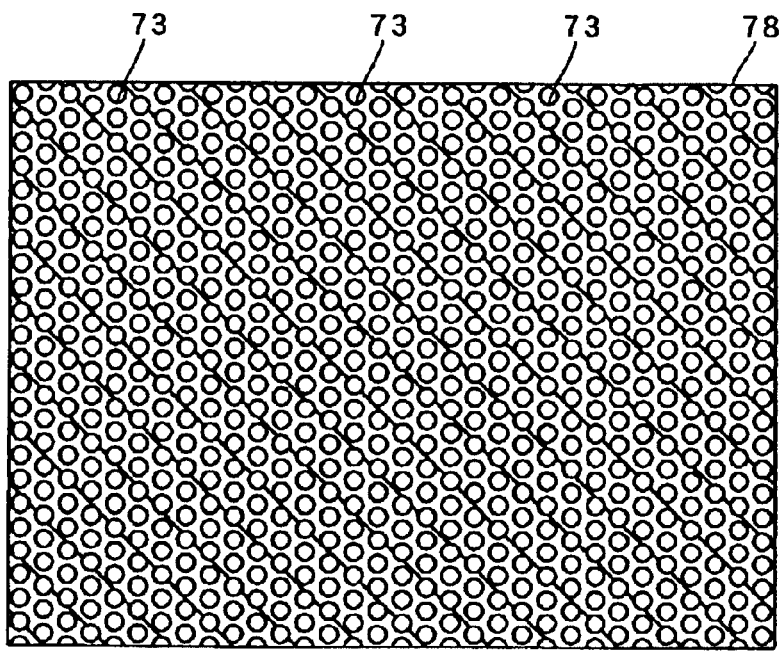
FIGS. 35 and 36 are plan views for illustrating a process of manufacturing grating groove patterns of a wave plate (polarization element) as an element having a microstructure according to a modification of the seventh embodiment.

According to the modification of the seventh embodiment, the concentration of an electrolyte, the temperature and the voltage are adjusted when acidically oxidizing an aluminum film (not shown), thereby forming the aluminum oxide film 78 having pores 73 arranged in the form of triangular lattices in a self-organized manner as shown in FIG. 35. More specifically, anodic oxidation is performed under conditions of an electrolyte concentration of about 0.3 mol (oxalic acid), a temperature of about 1° C. and a voltage of 40 V. The aluminum oxide film 78 is an example of the "metal oxide film" in the present invention.

Figure 36:
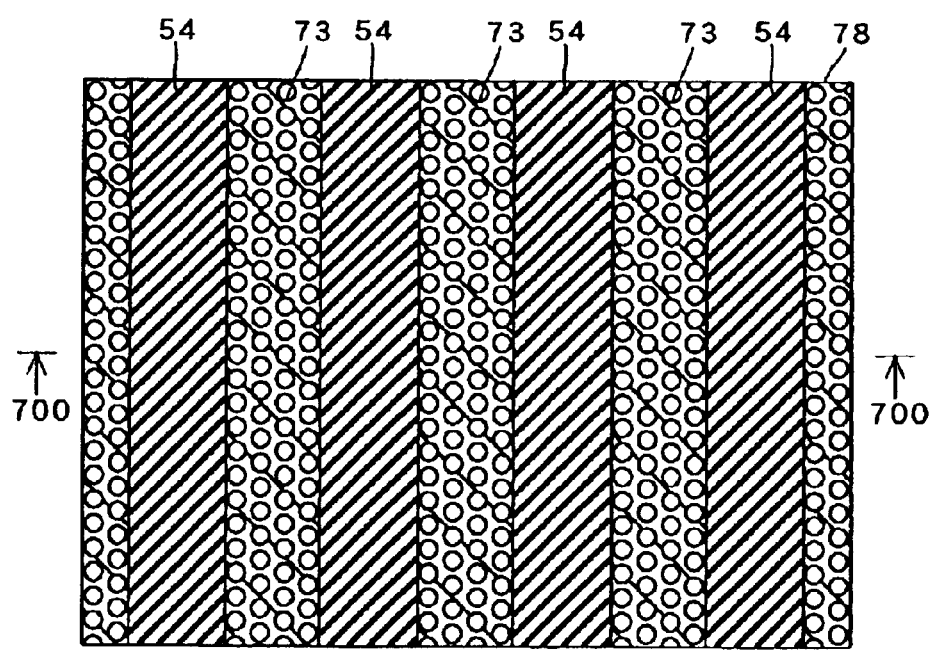
Figure 37:
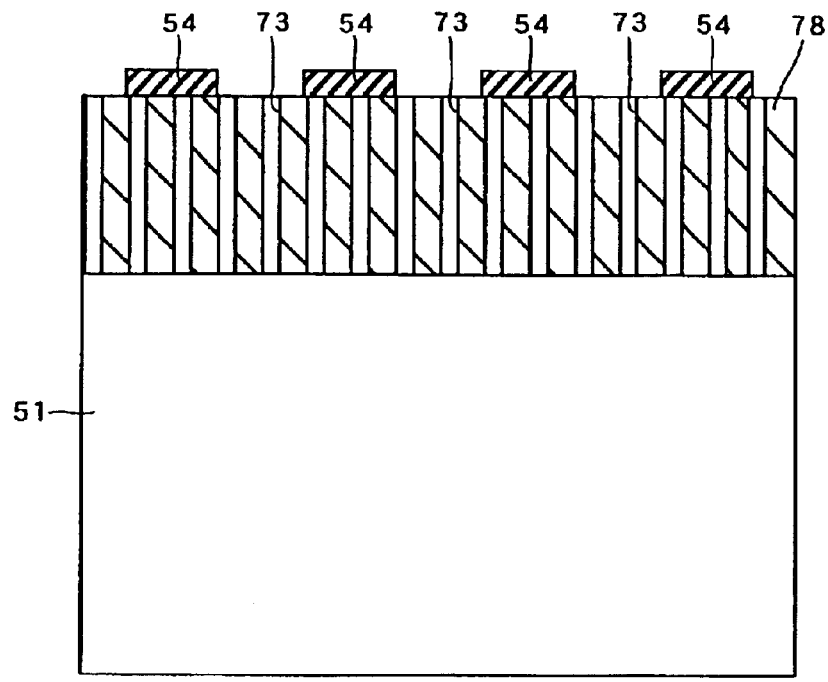
FIG. 37 is a sectional view taken along the line 700—700 in FIG. 36.
Figure 38:
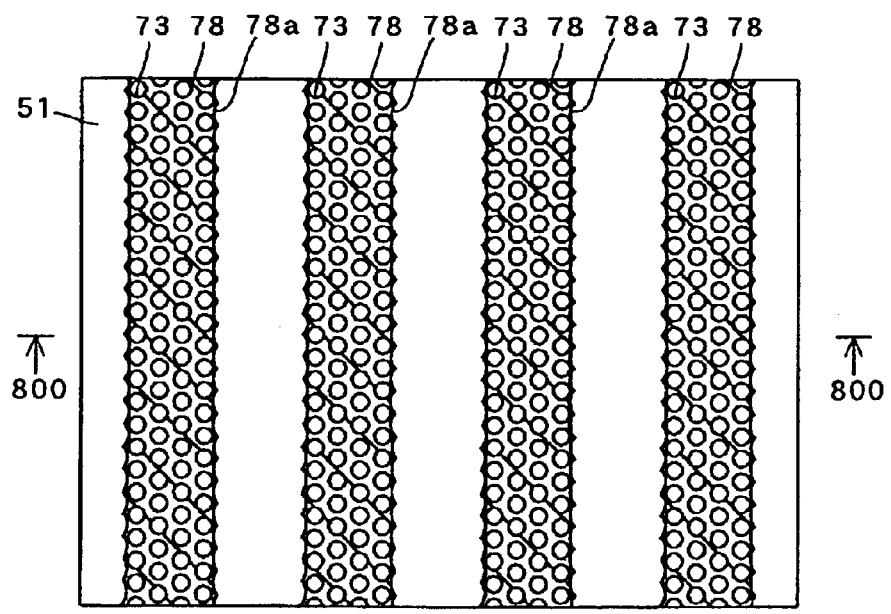
FIG. 38 is a plan view for illustrating the process of manufacturing the grating groove patterns of the wave plate (polarization element) as the element having a microstructure according to the modification of the seventh embodiment.
Figure 39:
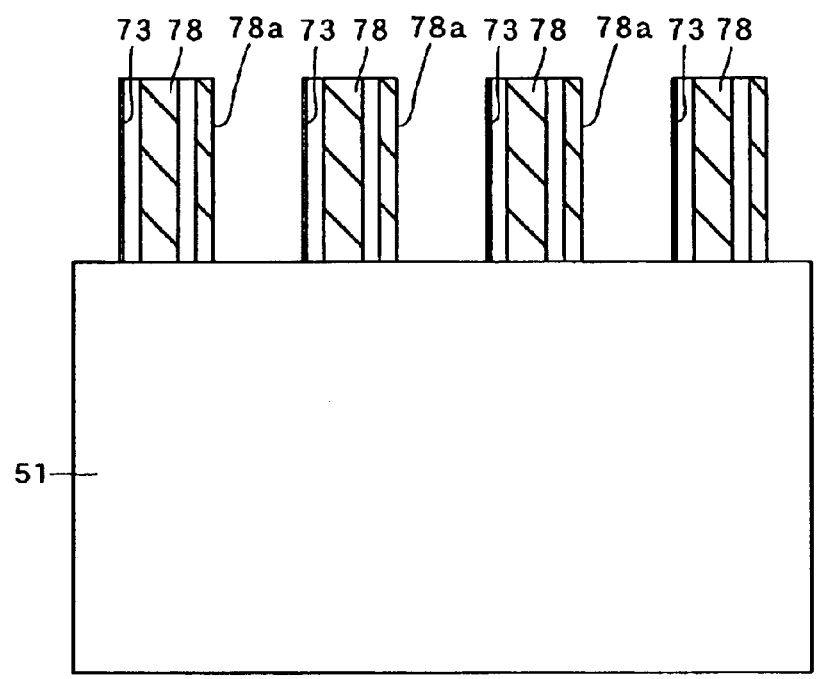
FIG. 39 is a sectional view taken along the line 800—800 in FIG. 38.

According to the modification of the seventh embodiment, rectilinear groove patterns are formed through a step similar to that according to the aforementioned seventh embodiment. As shown in FIGS. 36 and 37, mask layers 54 are periodically formed on the aluminum oxide film 78. Thereafter the pores 73 are enlarged by wet etching, thereby substantially completely removing portions of the aluminum oxide film 78 located on regions formed with grooves 78a as shown in FIGS. 38 and 39. Thus, the aluminum oxide film 78 is formed with rectilinear grating groove patterns. The grating groove patterns include the grooves 78a formed by coupling the pores 73 with each other as a belt. The grooves 78a of the grating groove patterns are uniformly formed along the depth direction to reach the transparent substrate 51.

According to the modification of the seventh embodiment, oxidation is performed under specific conditions adjusting the electrolyte concentration, the temperature and the voltage as hereinabove described, whereby the pores 73 can be formed in regular positions of the aluminum oxide film 78 for improving the dimensional accuracy of the grooves 78a formed by coupling the pores 73 with each other as a belt. Thus, a wave plate having a desired birefringence property can be easily prepared.

Although the present invention has been described and illustrated in detail, it is clearly understood that the same is by way of illustration and example only and is not to be taken by way of limitation, the spirit and scope of the present invention being limited only by the terms of the appended claims.

For example, while the present invention is applied to formation of an optical element such as a polarization element or a polarization-dependent diffraction element in each of the aforementioned embodiments, the present invention is not restricted to this but is also applicable to formation of an element, having grating groove patterns, other than the optical element.

While the present invention is applied to formation of a wave plate serving as a polarization element or a polarization-dependent diffraction grating serving as a polarization-dependent diffraction element in each of the aforementioned first to seventh embodiments, the present invention is not restricted to this but is also applicable to formation of a polarization element, a polarization-dependent diffraction element or a multilayer film element other than a wave plate or a polarization-dependent diffraction grating. For example, a polarized beam splitter or an isolator is conceivable as a polarization element other than a wave plate. On the other hand, a holographic optical element (HOE) or a Fresnel lens is conceivable as a polarization-dependent diffraction element other than a polarization-dependent diffraction grating. As a multilayer film element utilizing Bragg reflection or a waveguide multilayer film element, a waveguide filter (see FIG. 40), a reflector, a branching filter or a guided mode converter is conceivable.

Figure 40:
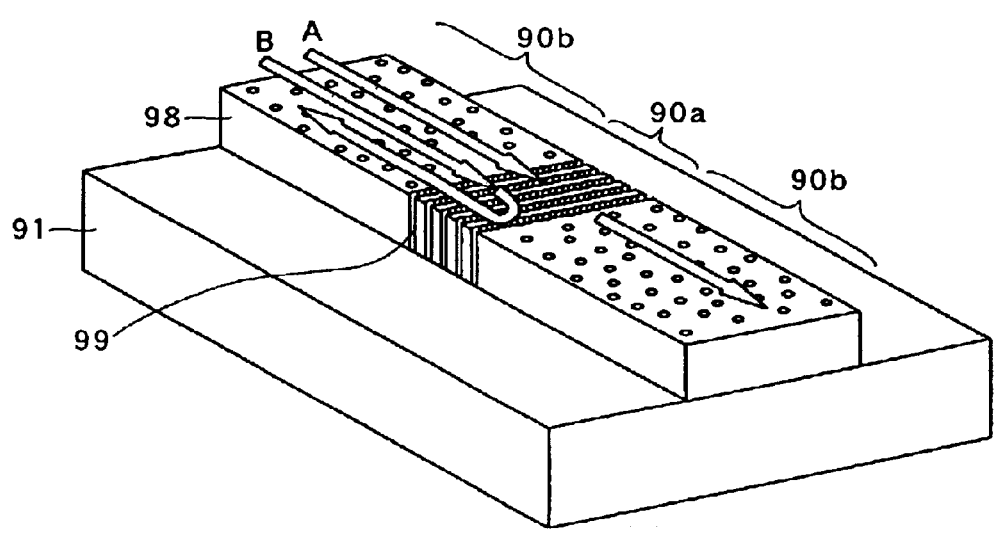
FIG. 40 is a perspective view showing the structure of a waveguide filter prepared by a method of manufacturing a microstructure according to the present invention.
Figure 41:
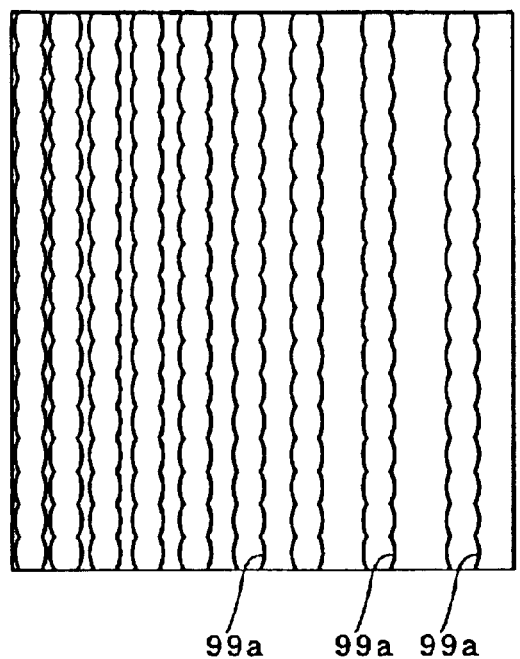
FIGS. 41 to 44 are plan views showing examples of the shapes of grating groove patterns formable by the method of manufacturing a microstructure according to the present invention.
Figure 42:
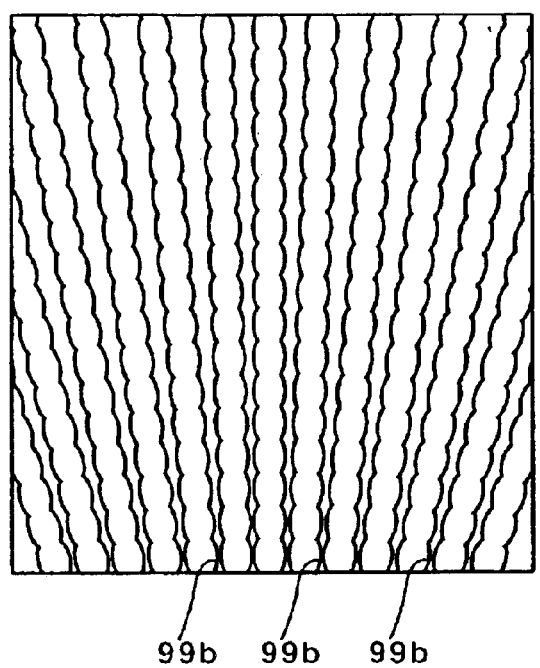
Figure 43:
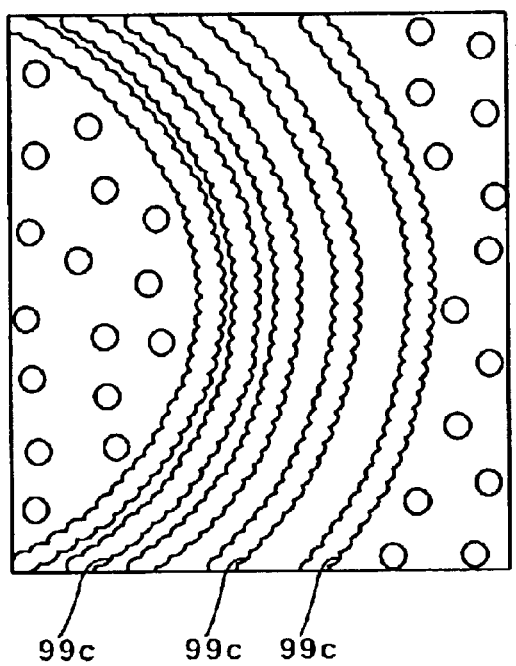

FIG. 40 shows the structure of a waveguide filter serving as the aforementioned multilayer film element. Referring to FIG. 40, a metal oxide film 98 having rectilinear grating groove patterns 99 according to the present invention is formed on a prescribed region of a substrate 91. The grating groove patterns 99 are arranged in the vicinity of the central portion of the metal oxide film 98, and serve as a filter part 90a. Regions of the metal oxide film 98 other than the filter part 90a serve as waveguides 90b. When guiding light A and light B having two types of wavelengths, the light A having a wavelength not satisfying Bragg reflection is transmitted through the filter part 90a, while the light B having a wavelength satisfying Bragg reflection is reflected by the filter part 90a. The grating groove patterns 99 serving as the filter part 90a may be formed to gradually change the pitch of grooves 99a as shown in FIG. 41, grooves 99b may be formed to radially extend as shown in FIG. 42, or grooves 99c may be arcuately formed as shown in FIG. 43. The arcuate grooves 99c shown in FIG. 43 can be formed through a process similar to those according to the aforementioned first to third, sixth and seventh embodiments.

Figure 44:
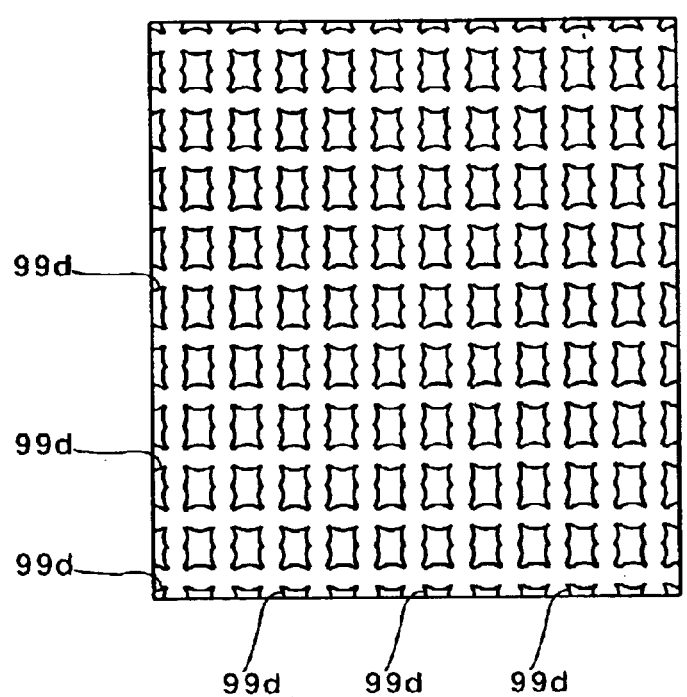
Figure 45:
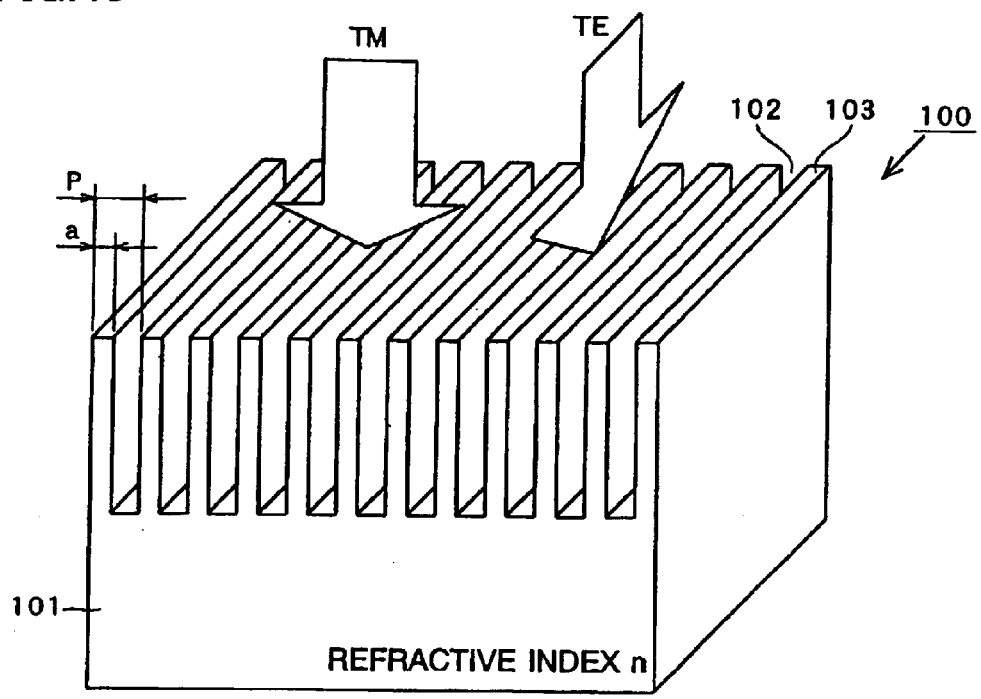
FIG. 45 is a perspective view showing a wave plate (polarization element) as an exemplary conventional element having a microstructure.
Figure 46:
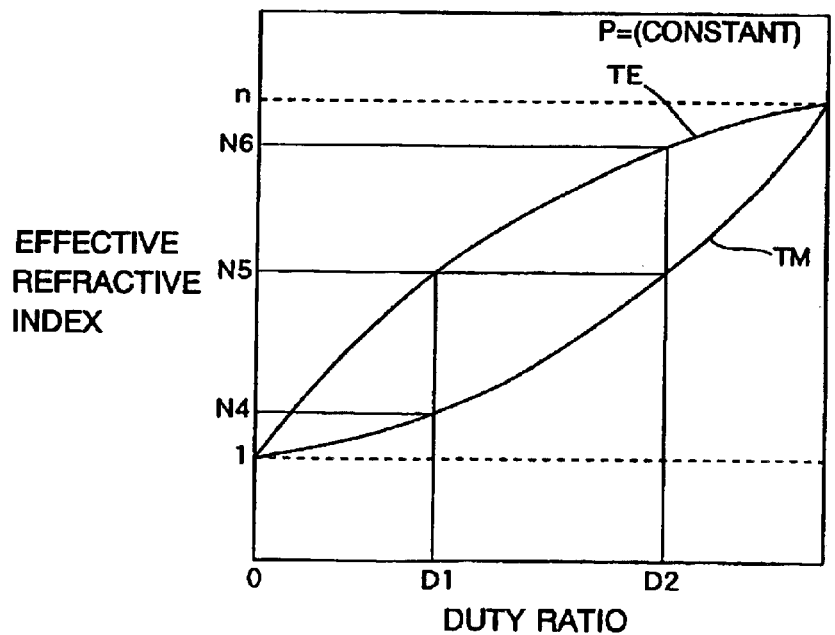
FIG. 46 is a correlation diagram showing the relation between the effective refractive index and the duty ratio of the conventional wave plate (polarization element) shown in FIG. 45.

The aforementioned polarization element, polarization-dependent diffraction element or multilayer film element may be formed with grating groove patterns having two-dimensionally (planarly) intersecting grooves 99d, as shown in FIG. 44.

While the aluminum film 3, 13, 23, 33 or 53 is anodically oxidized in each of the aforementioned first to seventh embodiments, the present invention is not restricted to this but a film of another valve metal such as titanium or tantalum may alternatively be anodically oxidized.

While the electrolyte employed for anodic oxidation is prepared from sulfuric acid or oxalic acid in each of the aforementioned first to seventh embodiments, the present invention is not restricted to this but the electrolyte may alternatively be prepared from phosphoric acid or the like.

While the cathode 6 or 36 employed for anodic oxidation is prepared from platinum in each of the aforementioned first to seventh embodiments, the present invention is not restricted to this but the cathode 6 or 36 may alternatively be prepared from another material.

While no transparent electrode film is formed between the transparent substrate 51 and the aluminum film 53 in each of the aforementioned sixth and seventh embodiments, the present invention is not restricted to this but a transparent electrode film may alternatively be formed between the transparent substrate 51 and the aluminum film 53 for applying a voltage to the aluminum film 53 through the transparent electrode film in oxidation. In this case, the voltage can be regularly applied to the aluminum film 53 during oxidation, whereby the aluminum film 53 can be prevented from disadvantageously leaving unoxidized portions also when the transparent substrate 51 has an irregular surface.

While the mask layers 54 are made of Ni in each of the aforementioned sixth and seventh embodiments, the present invention is not restricted to this but the mask layers 54 may alternatively consist of a metal other than Ni, an inorganic dielectric material such as $SiO_2$ or photoresist. In order to prevent pores located on the regions formed with the mask layers 54 from etching, the mask layers 54 are preferably prepared from a material having excellent durability against wet etching. In order to accurately form the etching grooves 50 in the aforementioned sixth embodiment, the mask layers 54 are preferably prepared from a material having excellent durability against dry etching. For example, Ta, Ti or Cr is conceivable as the material having excellent durability against dry etching.

While the mask layers 54 are periodically formed on the aluminum film 53 by the lift-off method in each of the aforementioned sixth and seventh embodiments, the present invention is not restricted to this but the mask layers 54 may alternatively be periodically formed on the aluminum film 53 by depositing a material for forming the mask layers 54 on the overall surface of the aluminum film 53 and thereafter forming isolation trenches with a focused ion beam (FIB).

While the etching grooves 50 are formed in the anodic oxidation step in the aforementioned sixth embodiment for improving accuracy of the positions for forming the pores 53a and 53b, the present invention is not restricted to this but the etching grooves 50 may not be formed.

While the aluminum oxide film 68 having the pores 63 arranged in the form of triangular lattices is formed in a self-organized manner by performing oxidation under specific conditions adjusting the electrolyte concentration, the temperature and the voltage in the aforementioned seventh embodiment, the present invention is not restricted to this but the aluminum oxide film 68 having the pores 63 arranged in the form of triangular lattices may alternatively be formed in a self-organized manner by performing oxidation after texturing.

Further, a step of annealing the aluminum film may be added before anodic oxidation, as reported in relation to conventional anodic oxidation of a bulk aluminum substrate. In this case, the positions of the micropores 63 can be more accurately controlled.

A molding prepared from a mold of the microstructure prepared according to the present invention also has equivalent element characteristics.

What is claimed is:

1. A method of manufacturing an element having a microstructure, comprising steps of:
   forming a metal layer on a substrate;
   forming a dot column of concave portions on the surface of said metal layer; and
   anodically oxidizing the surface of said metal layer formed with said dot column of concave portions while opposing this surface to a cathode surface thereby forming a metal oxide film having a linear grating groove pattern.

2. The method of manufacturing an element having a microstructure according to claim 1, wherein
   said step of forming said dot column of concave portions includes a step of forming said dot column of concave portions with deviation from a position for forming a triangular lattice.

3. The method of manufacturing an element having a microstructure according to claim 1, wherein
   said step of forming said metal oxide film having said grating groove pattern includes a step of anodically oxidizing the surface of said metal layer formed with said dot column while opposing this surface with said cathode surface thereby forming pores corresponding to said dot column and thereafter enlarging said pores corresponding to said dot column by etching thereby forming said metal oxide film having said grating groove pattern.

4. The method of manufacturing an element having a microstructure according to claim 1, further comprising a step of forming a transparent conductor film on said substrate in advance of said step of forming said metal layer on said substrate.

5. The method of manufacturing an element having a microstructure according to claim 1, wherein
   said step of forming said metal oxide film having said linear grating groove pattern includes a step of forming said metal oxide film having rectilinear grating groove pattern.

6. The method of manufacturing an element having a microstructure according to claim 1, wherein
   said step of forming said metal oxide film having said linear grating groove pattern includes a step of forming said metal oxide film having curvilinear grating groove pattern.

7. A method of manufacturing an element having a microstructure, comprising steps of:
   forming a metal layer on a substrate;
   forming a dot column of concave portions on the surface of said metal layer; and
   anodically oxidizing the surface of said metal layer formed with said dot column of concave portions while opposing this surface to a cathode surface thereby forming a metal oxide film having a rectilinear grating groove pattern.

8. A method of manufacturing an element having a microstructure, comprising steps of:
   forming a metal layer on a substrate;
   forming a dot column of concave portions on a side surface of said metal layer; and
   anodically oxidizing said side surface of said metal layer formed with said dot column of concave portions while opposing said side surface to a cathode end thereby forming a metal oxide film having a lattice pore pattern extending substantially in parallel with the surface of said substrate.

* * * * *